United States Patent
Kominato et al.

(10) Patent No.: US 6,580,862 B2
(45) Date of Patent: Jun. 17, 2003

(54) OPTICAL WAVEGUIDE CIRCUIT

(75) Inventors: Toshimi Kominato, Ibaraki (JP); Akio Sugita, Ibaraki (JP); Mikitaka Itoh, Ibaraki (JP); Yasuyuki Inoue, Ibaraki (JP); Yasuhiro Hida, Ibaraki (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/026,084

(22) Filed: Dec. 21, 2001

(65) Prior Publication Data

US 2002/0122650 A1 Sep. 5, 2002

(30) Foreign Application Priority Data

Dec. 22, 2000 (JP) .................... 2000-391100
Aug. 8, 2001 (JP) .................... 2001-241368
Aug. 8, 2001 (JP) .................... 2001-241369

(51) Int. Cl.⁷ .................... G02B 6/10
(52) U.S. Cl. .................... 385/131; 385/14; 385/46; 385/129
(58) Field of Search .................... 385/131, 129, 385/130, 132, 14, 24, 37, 46, 39, 123

(56) References Cited

U.S. PATENT DOCUMENTS 6,137,939 A * 10/2000 Henry et al. ............... 385/132
6,501,896 B2 * 12/2002 Nara et al. ................. 385/129

FOREIGN PATENT DOCUMENTS

EP  1 130424 A2 * 5/2001 ............... 385/129
JP  5-100124       4/1993

OTHER PUBLICATIONS

Flanders, "Submicrometer Periodicity Gratings As Artificial Anisotropic Dielectrics", Appl. Phy. Lett, 42 (6), Mar. 15, 1993, pp. 492–494.

* cited by examiner

Primary Examiner—Phan T. H. Palmer
(74) Attorney, Agent, or Firm—Kenyon & Kenyon

(57) ABSTRACT

An optical waveguide circuit is provided that can reduce or eliminate polarization dependence by reducing or eliminating birefringence. A substrate consists of a silicon substrate, and a cladding and a core are composed of silica-based glass. The core has a multilayer structure composed of a few types of layers with different refractive indices such as first core layers and second core layers stacked in the direction parallel to the substrate. As for the birefringence of the waveguide, the geometrical birefringence caused by the multilayer structure is canceled out by the other birefringence, thereby being able to reduce or eliminate the birefringence of the waveguide.

19 Claims, 25 Drawing Sheets

OPTICAL WAVEGUIDE CIRCUIT

This application is based on Japanese Patent Application Nos. 2000-391100 filed Dec. 22, 2000, 2001-241368 and 2001-241369 both filed Aug. 8, 2001, the content of which is incorporated hereinto by reference.

BACKGROUND OF THE INVENTION

1. Field of the Invention

The present invention relates to an optical waveguide circuit, and more particularly to an optical waveguide circuit which is an optical component used for an optical communication system, and to an optical waveguide circuit with slab waveguides.

2. Description of the Related Art

As the Internet has spread worldwide, it becomes the urgent necessity to construct communication systems that can transmit large amounts of data simultaneously at high speed. As a system that satisfies such a requirement, an optical communication system utilizing optical wavelength division multiplexing (WDM) receives attention, and is being introduced worldwide with the U.S. taking the lead.

To implement optical WDM technique, an optical multiplexer/demultiplexer capable of multiplexing and demultiplexing multiple different wavelengths is absolutely necessary. As one of its actual forms, there is an optical waveguide circuit that implements an optical circuit using optical waveguides on a substrate.

The optical waveguide circuits are ICs in the optical world, which apply the LSI microfabrication technology to form optical waveguides on a planar substrate integrally. Accordingly, they are superior as integrated circuits suitable for mass production, and capable of implementing high performance circuits with complicated circuit configurations. Recently, as the interest in the optical communication system has grown remarkably, the research and development of various materials such as semiconductor, LiNbO$_3$, plastics and silica-based glass has been advanced. Among them, silica-based optical waveguides, which are formed on silicon substrates using silica-based glass, have good matching with silica-based optical fibers constituting transmission lines of optical communications, and can implement stable operation of the optical circuits because of the high stability and long reliability based on the characteristics of the material. In addition, since rectangular cores can be formed at high reproducibility, theory and practice match closely, and high performance circuits with complicated optical circuits can be implemented. With such features, they lead other waveguide materials in practical use.

As basic configurations of the optical multiplexer/demultiplexers using the silica-based optical waveguides with such superior characteristics, there are Mach-Zehnder interferometers and arrayed waveguide gratings. Combining the Mach-Zehnder interferometers with arrayed waveguide gratings can implement various optical multiplexing and demultiplexing characteristics.

The Mach-Zehnder interferometer multiplexes or demultiplexes two different wavelengths, or divides different multiple wavelengths alternately and periodically. FIG. 1A shows a configuration of a Mach-Zehnder interferometer 101. It comprises two optical couplers 102, two optical waveguides 103 interconnecting the two optical couplers 102, and an input waveguide 104 and an output waveguide 105 for connecting it with other optical couplers 102. Here, each optical coupler is composed of a directional coupler consisting of two adjacent optical waveguides. Each optical waveguide is composed of a single-mode waveguide. The spacing between wavelengths to be multiplexed or demultiplexed is set by the waveguide length difference between the two optical waveguides 103.

The arrayed waveguide grating multiplexes and demultiplexes multiple different wavelengths simultaneously. It can achieve such a function with smaller size than achieving it using multiple Mach-Zehnder interferometers. FIG. 1B shows a configuration of an arrayed waveguide grating 111. It comprises two slab waveguides 112, a waveguide array 113 interconnecting the two slab waveguides 112, and an input waveguide 114 and an output waveguide 115 which are connected to different slab waveguides 112. The waveguide array 113, input waveguide 114 and output waveguide 115 are each composed of a single-mode waveguide. The waveguide array 113 comprises adjacent optical waveguides with different waveguide lengths, and the waveguide length difference between the adjacent waveguides determines the spacing between the wavelengths to be optically multiplexed and demultiplexed.

FIG. 2 is a cross-sectional view of a silica-based optical waveguide constituting these optical multiplexer/demultiplexers. It has a structure in which a core 203 is coated with a cladding 202 formed on a substrate 201. The substrate 201 consists of a silicon substrate or a silica substrate, and the cladding 202 and the core 203 are composed of silica-based glass. Using the silicon substrate as the substrate 201 serves as a platform for the hybrid mounting of photo-detectors, light emitting devices and the like. It can also prevent cracks of the cladding 202 and core 203 because of compressive stress imposed on them, thereby increasing reliability.

When using the silicon as the substrate, however, the optical characteristics of the Mach-Zehnder interferometer or the arrayed waveguide grating formed by the silica-based optical waveguides have polarization dependence in which the spectrum in a TM mode with the electric field perpendicular to the substrate shifts to a longer wavelength side as compared with that of a TE mode with the electric field parallel to the substrate.

FIG. 3 and FIGS. 4A and 4B are graphs each illustrating transmission spectra of a Mach-Zehnder interferometer or those of an arrayed waveguide grating. FIG. 3 illustrates transmission spectra of a Mach-Zehnder interferometer with a multiplexing/demultiplexing spacing of 0.8 nm. As illustrated in this figure, the peak wavelengths giving the least loss in the TE mode and TM mode are shifted by about 0.25 nm, and the loss of the other mode is greater about a few dB at each peak wavelength. FIG. 4A illustrates transmission spectra of an arrayed waveguide grating with a multiplexing/demultiplexing spacing of 0.8 nm, and FIG. 4B illustrates enlarged transmission spectra around 1562 nm of FIG. 4A. As in the Mach-Zehnder interferometer, the peak wavelengths that give the least loss for the TE mode and TM mode are shifted by about 0.25 nm, and the loss of the other mode is greater about a few dB at each peak wavelength.

Such polarization dependence in the optical multiplexer/demultiplexer, which makes the polarization direction of a signal light transmitted through an optical fiber indefinite and varied with time, will cause the insertion loss or crosstalk to vary with time, thereby degrading the reliability of the signal.

The polarization dependence of the optical multiplexer/demultiplexer is brought about by the waveguide birefringence of the optical waveguides constituting the circuit, where the effective refractive index of the TM mode perceives is greater than the effective refractive index of the TE mode. The polarization dependence occurs because of the waveguide birefringence of the two optical waveguides 103 in the Mach-Zehnder interferometer, and of the waveguide array 113 in the arrayed waveguide grating.

Defining that the waveguide birefringence of the silica-based optical waveguide is the difference obtained by subtracting the effective refractive index of the TE mode from the effective refractive index of the TM mode, it takes a value of about $2 \times 10^{-4} - 3 \times 10^{-4}$ in the single-mode waveguide. Such a waveguide birefringence results from the compressive stress on the optical waveguide, which is a residual thermal stress caused by the difference between the thermal expansion coefficient of the silicon constituting the substrate and that of the silica-based glass used as the material of the optical waveguide. In addition, since the thermal expansion coefficient varies depending on the type and concentration of the dopant of the silica-based glass, the waveguide birefringence varies even if the same material is used.

Thus, it is essential to eliminate the polarization dependence of the optical multiplexer/demultiplexer to implement it. To eliminate the polarization dependence, the following methods have been developed: (1) a method of reducing the stress imposed on the waveguide by forming grooves on both sides of the waveguide, thereby decreasing the waveguide birefringence; (2) a method of controlling the birefringence by forming a stress-applying film such as a-Si on the waveguide, and by trimming the stress-applying film with monitoring the optical circuit characteristics, thereby reducing the polarization dependence of the entire optical circuit; (3) a method of controlling the birefringence by irradiating ultraviolet rays on the waveguide with monitoring the optical circuit characteristics, thereby reducing the polarization dependence of the optical circuit in its entirety; (4) a method of inserting a half waveplate into the optical circuit to exchange the polarization mode, thereby reducing the polarization dependence of the entire optical circuit; and (5) a method of doping into the cladding covering the core a material that will increase the thermal expansion coefficient such as $GeO_2$, $B_2O_3$ and $P_2O_5$ to bring it close to the thermal expansion coefficient of the substrate, thereby reducing the birefringence. These methods can reduce the wavelength shift of the foregoing Mach-Zehnder interferometer and arrayed waveguide grating to an order of 0.01 nm. These techniques operate as a birefringence compensator for the optical waveguide circuit.

Although these techniques can implement optical waveguide circuits having polarization dependence eliminated, the following problems still arise to bring them into practical use.

As for the method (1), since the birefringence depends greatly on the position and depth of the grooves, it is sensitive to the fabrication accuracy, thereby reducing the yield and increasing the number of steps of the process. As for the method (2), although the requirement for the fabrication accuracy is not severe, it is unsuitable for the mass production because the optical circuit must be trimmed individually with monitoring the characteristics. As for the method (3), it is also unsuitable for the mass production because the optical circuit must be adjusted individually with monitoring the characteristics. As for the method (4), since the waveguide is cut by an amount equal to or greater than the thickness of the waveplate of more than ten microns to several tens of microns thick, the loss increases. As for the method of (5), when the stress on the cladding becomes the tensile stress, the cladding glass is apt to crack easily, and the weather resistance is decreased because of the heavily doped dopant, resulting in the reduction in the reliability.

Although the polarization dependence is described above which is caused by the waveguide birefringence the Mach-Zehnder interferometer has in its two optical waveguides 103 and the arrayed waveguide grating has in the waveguide array 113, the polarization dependence because of the waveguide birefringence the arrayed waveguide grating has in the slab waveguides cannot be ignored.

Cross-sectional structures of the waveguides of the arrayed waveguide grating are as follows. FIGS. 5A and 5B are views showing a cross-sectional structure of a slab waveguide and a waveguide array: FIG. 5A is a cross-sectional view of a slab waveguide; and FIG. 5B is a cross-sectional view of a waveguide array. A slab waveguide 502 with the cross-sectional view as shown in FIG. 5A has a structure in which a core 503 is coated with a cladding 502 on a substrate 501 with the width of the core 503 being spread in the direction parallel to the substrate. On the other hand, a waveguide array 504 with the cross-sectional view as shown in FIG. 5B comprises single-mode optical waveguides including cores 504 each having a core width nearly equal to the core thickness of the core 503 of the slab waveguide 502. In such silica-based optical waveguides, optical multiplexer/demultiplexer up to 128 waves is implemented.

As described above, as the methods to reduce the polarization dependence of the waveguide array 113, the foregoing methods (1)–(5) have been proposed. The wavelength shift amount of the arrayed waveguide grating, however, varies depending on the output ports of the output waveguide (115 of FIG. 1B). Thus, the conventional techniques for reducing the polarization dependence can little reduce the variations in the wavelength shift amount between the output ports, thereby limiting the reduction in the polarization dependence.

FIG. 6 is a graph plotting the wavelength shift of the TM mode with respect to the TE mode of the output ports of the arrayed waveguide grating that optically multiplexes or demultiplexes 32 light waves with a spacing of 0.8 nm. The light waves are input through input ports 16 of the input waveguide (114 of FIG. 1B). The variations in the wavelength shift amount are about 0.02 nm with a fixed gradient from the output port 1 to 32. The variations are caused by the waveguide birefringence of the slab waveguides 112 of about $1.1 \times 10^{-3}$.

SUMMARY OF THE INVENTION

Therefore, an object of the present invention is to provide an optical waveguide circuit that can reduce or eliminate its polarization dependence by reducing or eliminating the birefringence with solving the foregoing problems of the yield, mass production, optical characteristics and reliability.

Another object of the present invention is to provide an optical waveguide circuit with reduced polarization dependence caused by the waveguide birefringence of the slab waveguide by reducing the waveguide birefringence.

Still another object of the present invention is to provide an optical waveguide circuit with uniform polarization dependence by reducing the variations in the wavelength shift amount between output ports of the arrayed waveguide grating.

Another object of the present invention is to provide an optical waveguide circuit capable of decreasing the reduction limit of the polarization dependence by combining the present invention techniques with the polarization dependence reduction techniques described in connection with the conventional techniques.

According to one aspect of the present invention, there is provided an optical waveguide circuit including optical waveguides each of which has a cladding and a core formed on a substrate, wherein the optical waveguide circuit comprises at least one of a single-mode waveguide, a multi-mode waveguide and a slab waveguide, wherein at least one of the single-mode waveguide, the multi-mode waveguide and the slab waveguide includes at least in its part a multilayer structure that is composed of multiple types of layers with different refractive indices, and has at least three layers in total, wherein the multilayer structure has first birefringence and second birefringence, the first birefringence deriving from a fact that an effective refractive index of the entire core, which results from contributions of the layers to the refractive index, has different values in directions parallel to and perpendicular to the layers, and the second birefringence deriving from a structure of the waveguide, and wherein when defining a value of the birefringence of the waveguide as a value obtained by subtracting an effective refractive index in the direction parallel to the substrate from an effective refractive index in the direction perpendicular to the substrate, the value of the first birefringence and the value of the second birefringence have opposite signs.

Here, the second birefringence may have a positive value, and the multilayer structure may be composed of layers parallel to the substrate.

The second birefringence may have a negative value, and the multilayer structure may be composed of layers parallel to a light traveling direction and perpendicular to the substrate.

An absolute value of geometrical birefringence caused by the multilayer structure may be less than twice an absolute value of a remaining birefringence value.

Values $B_{SM}$, $B_{MM}$ and $B_{SL}$ may differ from each other, where $B_{SM}$, $B_{MM}$ and $B_{SL}$ are geometrical birefringence values caused by the multilayer structure of the single-mode waveguide, that of the multi-mode waveguide and that of the slab waveguide.

The values $B_{SM}$, $B_{MM}$ and $B_{SL}$ may satisfy a relationship of $|B_{SM}|<|B_{MM}|<|B_{SL}|$.

The refractive indices and thicknesses of the layers constituting the multilayer structure may be substantially symmetrical with respect to a central layer.

The multilayer structure may be composed of two types of layers that have different refractive indices, and are stacked nearly alternately.

As for the layers constituting the multilayer structure, thicknesses of at least layers with highest refractive index may be increased from two end layers adjacent to the cladding to a central layer; thicknesses of at least layers with lowest refractive index may be decreased from the two end layers adjacent to the cladding to the central layer; or the thicknesses of at least the layers with the highest refractive index may be increased from two end layers adjacent to the cladding to a central layer, and the thicknesses of at least the layers with the lowest refractive index may decrease from the two end layers adjacent to the cladding to the central layer. The refractive indices of layers constituting the multilayer structure may increase from two end layers adjacent to the cladding toward inmost part of the core.

The total number of the layers of the multilayer structure may be five to ten.

An average refractive index $n_{ave}$ of the core due to the multilayer structure may given by the following equations (2) and (3), and an absolute value of geometrical birefringence $B_s$ caused by the multilayer structure may be give by the following equations (1) and (3):

$$|B_s| = c_1 \left| \sqrt{\sum_i^N n_i^2 q_i} - \frac{1}{\sqrt{\sum_i^N \frac{q_i}{n_i^2}}} \right| + c_2 \qquad (1)$$

$$n_{ave} = \sum_i^N n_i q_i \qquad (2)$$

$$q_i = \frac{t_i}{\sum_i^N t_i} \qquad (3)$$

where N is the number of layers of the multilayer structure, $n_i$ and $t_i$ are refractive indices and thicknesses the individual layers, and $c_1$ and $c_2$ are fixed values determined for each waveguide structure by actual measurement or calculation.

The substrate may consist of one of a silicon substrate, and the waveguide may be composed of silica-based glass.

The substrate may consist of a silica substrate, and the waveguide may be composed of silica-based glass.

The optical waveguide circuit may further comprise an optical interferometer including two optical couplers and a plurality of waveguides with different lengths interconnecting the two optical couplers, wherein as for a waveguide with a minimum waveguide length among the plurality of waveguides, when a length of the multilayer structure of its core is L, and as for the remaining waveguides of the plurality of waveguides, lengths of their multilayer structures equal to L plus differences between lengths of the remaining waveguides and the minimum waveguide length.

The optical waveguide circuit may further comprise a Mach-Zehnder interferometer including two optical couplers and two single-mode waveguides interconnecting the two optical couplers.

The optical waveguide circuit may further comprise an arrayed waveguide grating including: two slab waveguides; a waveguide array consisting of a plurality of single-mode waveguides with different lengths interconnecting the slab waveguides; an input waveguide consisting of single-mode waveguides connected to one of the two slab waveguides; and an output waveguide consisting of single-mode waveguides connected to the other of the two slab waveguides.

The optical waveguide circuit may further comprise a birefringence compensator.

The birefringence compensator may utilize a half wave-plate.

Next, a structure common to the single-mode waveguide, multi-mode waveguide and slab waveguide will be described in detail together with a structure associated with the single-mode waveguide and the multi-mode waveguide.

The present invention differs from the conventional techniques in that its core has a multilayer structure composed of multiple layers with different refractive indices. In addition, as for the birefringence of the waveguide, the geometrical birefringence caused by the multilayer structure is canceled out by the other birefringence to reduce or eliminate the birefringence of the waveguide. Specifically, the birefringence of the waveguide can be reduced or eliminated by determining the value of the geometrical birefringence caused by the multilayer structure to have the opposite sign to the value of the other birefringence. Here, placing the magnitude of the geometrical birefringence caused by the multilayer structure at nearly the same value (absolute value) as the magnitude of the other birefringence with the opposite sign makes it possible to bring the birefringence of the waveguide to nearly zero.

The core with the multilayer structure composed of layers with different refractive indices can bring about the geometrical birefringence that will increase the effective refractive index in the direction parallel to the multilayer structure. The magnitude of the geometrical birefringence is determined by the refractive indices and thicknesses of the individual layers. Accordingly, the birefringence of the waveguide can be eliminated by forming the layers in such a manner that they will reduce the waveguide birefringence caused by the residual thermal stress and the like, and by making the magnitude $|B_s|$ of the geometrical birefringence caused by the multilayer structure nearly equal to the magnitude $|B_0|$ of the waveguide birefringence caused by the residual thermal stress and the like. Thus, the polarization dependence of the optical waveguide circuit can be reduced. The birefringence can be reduced as compared with the conventional technique by making $|B_s|<2|B_0|$. In this case, it is not necessary that the cores of all the optical waveguides of the optical waveguide circuit have a multilayer structure. It is enough that portions of the optical waveguides that will cause the polarization dependence of the optical waveguide circuit are made multiple.

When using the silica-based glass as the material of the optical waveguides and the silicon as the substrate, the optical waveguides undergo the compressive stress. In this case, the effective refractive index increases in the electric field perpendicular to the substrate (TM mode). Therefore, the birefringence of the optical waveguide can be reduced by forming the multilayer structure in the direction parallel to the substrate so that the birefringence caused by the compressive stress is canceled out by the geometrical birefringence due to the multilayer structure. In contrast, the silica substrate will increase the effective refractive index of the optical waveguide in the electric field parallel to the substrate (TE mode). Therefore, the birefringence of the optical waveguide can be reduced by the multilayer structure perpendicular to the substrate.

The single-mode waveguide with a multilayer structure composed of layers with different refractive indices can reduce the birefringence of the waveguide. For example, the polarization dependence of the arrayed waveguide grating is mainly due to the waveguide birefringence of the waveguide array composed of the single-mode waveguides as described above. Accordingly, the optical waveguides of the waveguide array with a multilayer structure can reduce the birefringence of the optical waveguide, thereby being able to reduce the polarization dependence. In addition, the waveguide array composed of optical waveguides, each of which includes a multilayer core with the same order of length as their integral parts, that is, a multilayer core formed in an appropriate part of each optical waveguide having influence on the polarization dependence, can reduce the polarization dependence as compared with the conventional techniques.

In addition, the multi-mode waveguide with the multilayer structure composed of the layers with different refractive indices can reduce the birefringence of the optical waveguide. For example, a multi-mode interferometer (called "MMI" from now on) using a multi-mode waveguide with a width several times wider than the single-mode waveguide as its optical coupler has the polarization dependence in the excess loss. However, the polarization dependence in the excess loss can be reduced by the multilayer structure.

In addition, the multilayer structure, which is applied to the cores of both the single-mode waveguide and multi-mode waveguide rather than to the core of only one of them, can further reduce the polarization dependence of the optical waveguide circuit. For example, as for the Mach-Zehnder interferometer using the MMI as the optical couplers, the multilayer structure can be applied to the two single-mode waveguides interconnecting the two MMIs and to the multi-mode waveguides of the two MMIs at the same time to further reduce its polarization dependence.

The waveguide birefringence value can vary depending on the geometry of the optical waveguide such as its dimension. In this case, the multilayer structures with suitable geometrical birefringence values, which are applied to the single-mode waveguide and multi-mode waveguide, respectively, can reduce the polarization dependence of the optical waveguide circuit appropriately. As with the silica-based optical waveguides, the waveguide birefringence is apt to increase with the width of the waveguide. Therefore, the multilayer structure should be formed such that the geometrical birefringence value of the multi-mode waveguide is made greater than that of the single-mode waveguide.

As for the multilayer structure, it is possible to align the center of the distribution of the electromagnetic field of the traveling light close to the center of the core as in the conventional techniques by making the refractive indices and thicknesses of the layers of the multilayer structure core nearly symmetric with respect to the central layer of the layers. In addition, this enables the distribution profile of the electromagnetic field to be nearly symmetric with respect to the core center in both the directions perpendicular and parallel to the substrate. Therefore, the circuit design analogous to that of the conventional techniques can implement desired circuit characteristics.

In addition, stacking at least two layers with different refractive indices alternately makes it possible to consider the refractive indices the light perceives in the direction perpendicular to the layer are nearly constant. As a result, the birefringence of the optical waveguide can be reduced or eliminated with maintaining the distribution of the electromagnetic field at nearly the same profile as that of the conventional one.

In addition, the graded-index, which increases the refractive indices of the individual layers of the multilayer structure from both ends of the cladding to the center of the core, can reduce or eliminate the birefringence of the optical waveguide with implementing a spot size different from that of the conventional optical waveguide.

As for the total number of the layers of the multilayer structure, the multilayer structure of the core with five to ten layers can be implemented easily even by the thick film fabrication process such as flame hydrolysis deposition (FHD). In addition, the connection loss with the optical fibers can also be reduced as will be described later in connection with the embodiments in accordance with the present invention.

The multilayer structure can be determined without any complicated analysis by determining the factors such that they approximately satisfy the following equations (1)–(3).

$$|B_s| = c_1 \left| \sqrt{\sum_i^N n_i^2 q_i} - \frac{1}{\sqrt{\sum_i^N \frac{q_i}{n_i^2}}} \right| + c_2 \quad (1)$$

$$n_{ave} = \sum_i^N n_i q_i \quad (2)$$

$$q_i = \frac{t_i}{\sum_i^N t_i} \quad (3)$$

where $|B_s|$ is the geometrical birefringence value due to the multilayer structure, $n_{ave}$ is the average refractive index of the core in the multilayer structure, N is the total number of the layers of the multilayer structure, $n_i$ and $t_i$ are refractive index and thickness of each layer of the multilayer structure, and $c_1$ and $c_2$ are constants (correction coefficients) that are determined by calculation or measurement in accordance with the waveguide structure.

In the right side of equation (1), the term $$\sqrt{\sum_i^N n_i^2 q_i}$$

represents the effective refractive index in the direction parallel to the layers, and the term $$\frac{1}{\sqrt{\sum_i^N \frac{q_i}{n_i^2}}}$$

represents the effective refractive index in the direction perpendicular to the layers. Accordingly, the difference between them is the geometrical birefringence originating from the multilayer structure. The calculated values of them are associated with the geometrical birefringence value $|B_s|$, which is obtained by actual measurement or calculation, by the correction coefficients $c_1$ and $c_2$ as in equation (1).

The correction coefficients $c_1$ and $c_2$ mainly depend on the confinement of light due to the waveguide structure (relative refractive index difference and dimension), thereby taking nearly fixed values for the optical waveguides in which the confinement of light is constant. Accordingly, obtaining the correction coefficients by prototyping an appropriate multilayer structure core or by carrying out mode solver of an appropriate multilayer structure core can facilitate the design of the multilayer structure that will satisfy the desired geometrical birefringence.

As for the multilayer structure in which at least two layers with different refractive indices are stacked alternately, the correction coefficient $c_1 = 1$ nearly corresponds to the case where the core confines the light sufficiently. When the confinement is weaker, the coefficient is mainly set less than one.

Among the optical waveguide circuits, the polarization dependence appears conspicuously in an optical interferometer that interconnects a first optical coupler and a second optical coupler by multiple waveguides with different waveguide lengths. The Mach-Zehnder interferometer and arrayed waveguide grating are a typical example of them. It is possible to provide optical circuits with smaller polarization dependence by reducing the waveguide birefringence of the optical interferometer by means of the multilayer structure core. In the optical interferometer, the polarization dependence of the circuit can be reduced or eliminated by reducing or eliminating the polarization dependence by an amount corresponding to the waveguide length difference. Specifically, the multilayer structure cores are to be formed over the lengths corresponding to the waveguide length differences from the shortest waveguide length in the optical waveguides. Alternatively, the multilayer structure can be constructed over the lengths corresponding to the waveguide length differences plus a fixed length. Specifically, as for the individual waveguides, the portions of the cores to have the multilayer structure can be set as follows. Here, the entire cores of the waveguides can also have the multilayer structure.

TABLE 1

| optical waveguides | Lengths of cores to be made multilayer structure |
|---|---|
| optical waveguide with shortest waveguide length ($L_1$) | L ($0 \leq L \leq L_1$) |
| optical waveguide with second shortest waveguide length ($L_2$) | L + ($L_2 - L_1$) |
| . | . |
| . | . |
| . | . |
| optical waveguide with ith shortest waveguide length ($L_i$) | L + ($L_i - L_1$) |
| . | . |
| . | . |
| . | . |

In addition, it is not necessary that the multilayer structure core is formed continuously, but that the total waveguide length becomes a prescribed length. The optical interferometer can include an optical interferometer that has its multiple optical couplers such as lattice-form filters connected by the multiple waveguides.

When a plurality of multilayer structures are required, combining the present invention technique with the birefringence compensator of the conventional techniques for eliminating the polarization dependence described above can reduce the number of types of the multilayer structures to be formed. In addition, when it is difficult to fabricate the multilayer structure that will provide predetermined geometrical birefringence, the combination can eliminate the waveguide birefringence by the geometrical birefringence implementable by the multilayer structure. Thus, it is possible to increase the flexibility of selecting structural parameters of the multilayer structure. As an example of reducing the number of types of the multilayer structures to be formed, let us consider an example in which a half waveplate is applied to a Mach-Zehnder interferometer using MMI as its optical couplers. The half waveplate is inserted into the single-mode waveguides between the optical couplers to eliminate the polarization dependence due to the waveguide birefringence of the single-mode waveguides. As for the multilayer structure, only one multilayer structure is formed for the multi-mode waveguide core. In addition, as a method of eliminating the waveguide birefringence by the geometrical birefringence achievable by the multilayer structure that can be fabricated, a material for increasing the thermal expansion coefficient such as $GeO_2$, $B_2O_3$ and $P_2O_5$ can be doped into the conventional technique cladding, and adjusted to a geometrical birefringence value implementable by the multilayer structure, for example. In this case, the doping must be carried out at such a level that no tensile stress takes place to maintain the reliability at a certain level.

As described above, it is not necessary for the core of the waveguide to have the multilayer structure over its entire length. Thus, a waveguide with a combination of a multilayer structure core and a uniform core can also be used. In such a waveguide, its birefringence can be reduced or eliminated by making the average refractive index of the multilayer structure core equal to the refractive index of the uniform core, and by making the geometrical birefringence value due to the multilayer structure nearly equal and opposite in sign to the birefringence value of the uniform core. Here, it is assumable that the average refractive index of the multilayer structure core is given by equations (2) and (3), and that the geometrical birefringence caused by the multilayer structure value is given by equations (1) and (3).

As described above, the present invention can eliminate or reduce the waveguide birefringence, and hence can eliminate or reduce the polarization dependence of the optical circuit. In addition, the present invention, which forms cores with a multilayer structure, can employ the conventional fabrication method of the waveguides as described above. Accordingly, it can fabricate optical circuits without decreasing its manufacturing yield, mass productivity, optical characteristics and reliability, which are the problems of the foregoing conventional elimination techniques of the polarization dependence. As a result, the present invention can provide a low cost, high performance, high reliability practical optical circuit.

Next, a configuration of the slab waveguide will be described along with a configuration of a combination of the single-mode waveguide and the multi-mode waveguide. The idea of the configuration of the slab waveguide is the same as that applied to the configuration of the single-mode waveguide and the multi-mode waveguide.

According to the present invention, the multilayer structure, which is composed of layers with different refractive indices and is applied to the slab waveguide core, can bring about the geometrical birefringence that has a higher effective refractive index in the direction parallel to the layers. Forming the multilayer structure core in the direction that will compensate for the birefringence (waveguide birefringence) caused by the residual thermal stress and the like can implement a slab waveguide with reduced waveguide birefringence, which is an object of the present invention, thereby reducing the polarization dependence of the optical circuit caused by the waveguide birefringence of the slab waveguide. In particular, the wavelength shift amounts of the individual output ports of the arrayed waveguide grating can be made uniform. In addition, combining the slab waveguide with the conventional polarization dependence reduction techniques (birefringence compensator) can provide an optical waveguide circuit, the reduction limit of the polarization dependence of which is lowered.

In addition, as for the optical waveguide using silica-based glass as its material and silicon as the substrate, the effective refractive index of the optical waveguide is greater in the electric field in the direction perpendicular to the substrate (TM mode). Accordingly, using the multilayer structure in the direction parallel to the substrate enables the waveguide birefringence due to the stress and the geometrical birefringence due to the multilayer structure to be canceled out each other, thereby implementing the slab waveguide with small waveguide birefringence.

In addition, when a silica substrate is used, the effective refractive index of the optical waveguide is greater in the electric field parallel to the substrate (TE mode). Accordingly, a multilayer structure in the direction perpendicular to the substrate can reduce the waveguide birefringence of the slab waveguide. Thus, the polarization dependence of the optical circuit caused by the waveguide birefringence of the slab waveguide can be reduced. In particular, the wavelength shift amounts of the individual output ports of the arrayed waveguide grating can be made uniform.

In addition, in the silica-based optical waveguides, the slab waveguide with the conventional structure has greater waveguide birefringence than the single-mode waveguide with the conventional structure. To form a multilayer structure with the geometrical birefringence that will cancel out the waveguide birefringence, the geometrical birefringence due to the multilayer structure of the slab waveguide core is made greater than the geometrical birefringence due to the multilayer structure of the single-mode waveguide core. Applying the multilayer structures that can eliminate the waveguide birefringence to the slab waveguide and to the single-mode waveguide independently makes it possible to provide a circuit with small polarization dependence. In particular, the arrayed waveguide grating can make uniform the wavelength shift amounts of the individual output ports, and reduce or eliminate the wavelength shift.

In addition, combining the present invention technique with the conventional polarization dependence reduction techniques can provide an optical waveguide circuit that can lower the reduction limit of the polarization dependence.

In addition, the multilayer structure comprising layers with a high refractive index and layers with a low refractive index which are disposed alternately makes it possible to implement a slab waveguide that has the same effective refractive index as the conventional one, and has the refractive index the light perceives in the direction perpendicular to the layers being almost uniform. Thus, optical circuits can be constructed using the slab waveguide with the same geometry as the conventional one.

In addition, as described above, the waveguide birefringence of the slab waveguide is greater than that of the single-mode waveguide in the silica-based optical waveguide. The waveguide birefringence can vary according the geometry such as the dimension of the optical waveguide, and increases with an increase in the core width of the optical waveguide in the silica-based optical waveguide. Accordingly, as for an optical multiplexing/demultiplexing circuit comprising a combination of an arrayed waveguide grating, which is composed of the single-mode waveguide, multi-mode waveguide and slab waveguide, and a Mach-Zehnder interferometer which comprises optical couplers consisting of multi-mode interferometers (called "MMI" from now on), using separate multilayer structures, in which the geometrical birefringence due to the multilayer structure increases in the order of the single-mode waveguide, multi-mode waveguide and slab waveguide, can eliminate the waveguide birefringence, and provide a circuit with a small polarization dependence.

In addition, the center of the distribution of the electromagnetic field of the traveling light can be aligned closely to the center of the core as in the conventional devices by making the refractive indices and thicknesses of the individual layers of the multilayer structure of the core nearly symmetry with respect to the central layer of the layers. In addition, this enables the profile of the distribution of the electromagnetic field to be nearly symmetry with respect to the core center in the directions perpendicular and parallel to the substrate. As a result, desired circuit characteristics can be implemented using nearly the same circuit design method as the conventional techniques.

In addition, the graded-index, which increases the refractive indices of the individual layers of the multilayer structure from both ends of the cladding to the center of the core, can reduce or eliminate the birefringence of the optical waveguide with implementing a spot size different from that of the conventional optical waveguide.

As for the total number of the layers of the multilayer structure, five to ten layers can implement the multilayer structure of the core easily even by the thick film fabrication process such as FHD. In addition, the connection loss with the optical fibers can be reduced as will be described in the embodiments in accordance with the present invention.

The multilayer structure can be determined without any complicated analysis by determining the factors such that they approximately satisfy the foregoing equations (1)–(3). As for the multilayer structure in which at least two layers with different refractive indices are stacked alternately, the correction coefficient $c_1=1$ nearly corresponds to the case where the core confines the light sufficiently. When the confinement is weak, it is mainly set less than one.

In addition, the present invention technique combined with the conventional polarization dependence reduction techniques (birefringence compensator) can eliminate the polarization dependence of the optical waveguide circuit. For example, the multilayer structure is applied to the cores of the slab waveguides and multi-mode waveguide in the arrayed waveguide grating and in the Mach-Zehnder interferometer using the MMI as the optical couplers. As for the single-mode waveguide, which brings about the polarization dependence of the optical circuit by the birefringence, the half waveplate is inserted into the waveguide array of the arrayed waveguide grating, and into the optical waveguides between the optical couplers of the Mach-Zehnder interferometer. Thus, the polarization dependence can be reduced.

In addition, it is not necessary for the cores of all the optical waveguides of the optical waveguide circuit to have the multilayer structure. It is enough that portions of the optical waveguides affecting the polarization dependence of the optical waveguide circuit are made multilayer. For example, as for the arrayed waveguide grating, it is enough that the individual waveguides of the waveguide array and the slab waveguides have the multilayer structure. In addition, applying the multilayer structure to part of them can reduce the polarization dependence as compared with the conventional one. For example, providing the individual waveguides of the waveguide array with multilayer cores of the same order, that is, providing multilayer cores to appropriate portions of the optical waveguides affecting the polarization dependence can reduce the polarization dependence.

As described above, according to the present invention, the waveguide birefringence of the slab waveguide can be reduced, and the polarization dependence caused by the waveguide birefringence of the slab waveguide can be reduced. In particular, the wavelength shift of the individual output ports of the arrayed waveguide grating can be made uniform. In addition, combining the present invention technique with the conventional polarization dependence reduction techniques makes it possible to lower the reduction limit of the polarization dependence, thereby providing a high performance optical waveguide circuits. This means that the loss of signals passing through the optical multiplexer/demultiplexer and the fluctuations of the crosstalk thereof are reduced in the optical multiplexer/demultiplexer, and that the reliability is increased of the signals in the optical communication system using the optical WDM technique.

Next, configurations other than the foregoing configurations will be described which are applicable to the single-mode waveguide, multi-mode waveguide and slab waveguide.

In at least one of the multilayer structures formed in the cores of the optical waveguides of the optical waveguide circuit, the graded-index can be implemented which has a refractive index that effectively increases from the end layers to the center of the cladding, and the birefringence of the optical waveguides can be reduced or eliminated together with implementing a different spot size in the following structure: at least layers with higher refractive indices are made thicker from the end layers to the center of the cladding; at least layers with lower refractive indices are made thinner from the end layers to the center of the cladding; and at least layers with higher refractive indices are made thicker from the end layers to the center of the cladding, and at least layers with lower refractive indices are made thinner from the end layers to the center of the cladding.

The above and other objects, effects, features and advantages of the present invention will become more apparent from the following description of embodiments thereof taken in conjunction with the accompanying drawings.

DESCRIPTION OF THE PREFERRED EMBODIMENTS

The embodiments in accordance with the present invention will now be described in detail.

In the following description of the embodiments, the refractive indices of the individual layers of the multilayer structure core and the average refractive index of the core are represented in terms of the relative refractive index difference and the average relative refractive index difference from those of the under-cladding. The refractive index of the under-cladding is made equal to the refractive index of the silica glass.

[Embodiment 1]

Figure 7:
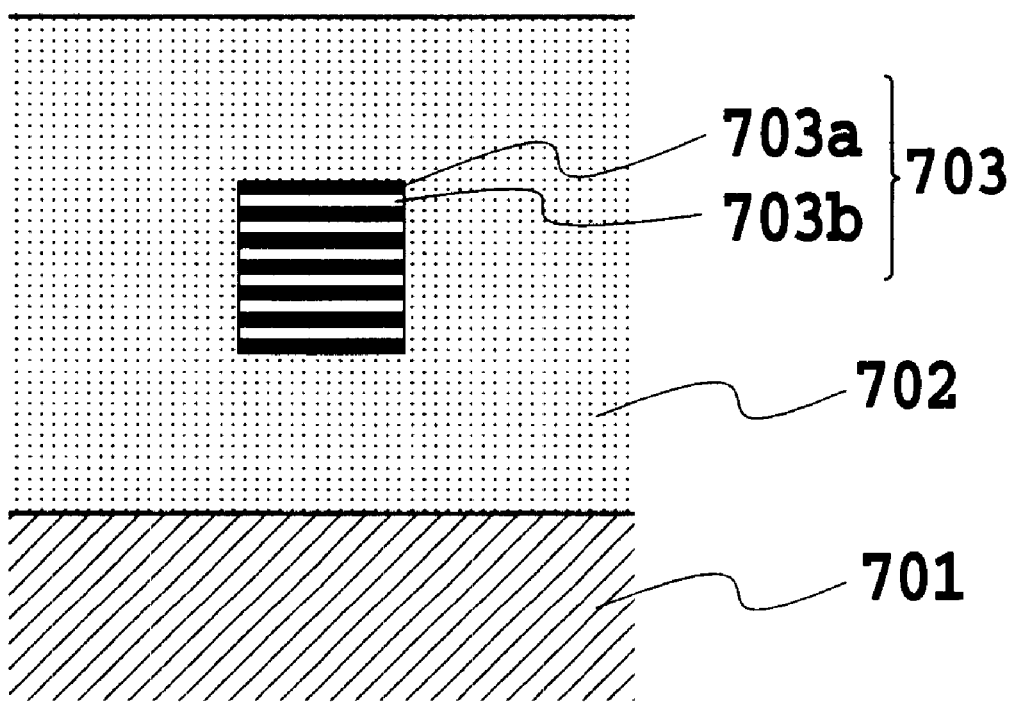
FIG. 7 is a cross-sectional view of an optical waveguide of a first, second, third, fourth and eighth embodiments in accordance with the present invention.

FIG. 7 is a cross-sectional view of a single-mode waveguide of a first embodiment in accordance with the present invention. A silicon substrate is used as a substrate 701, and silica-based glass is used to form a cladding 702 and a core 703. The core 703 has a multilayer structure including first core layers 703a and second core layers 703b which are stacked alternately by multiple times.

In the present embodiment, the core has a multilayer structure perpendicular to the surface of the substrate as shown in FIG. 7. Specifically, the core 703 comprises the first core layers 703a and second core layers 703b which are parallel to the surface of the substrate, and are stacked alternately in the direction perpendicular to the surface of the substrate to form the multilayer structure.

The relative refractive index differences $\Delta_i$ and layer thicknesses $t_i$ (i=1 and 2) of the first core layers 703a and second core layers 703b are set in the following procedures. Procedure 1) Fabricate an optical circuit with an appropriate multilayer structure, and estimate the geometrical birefringence due to the multilayer structure value from its characteristics. From the results and equations (1)–(3), the correction coefficients $c_1$ and $c_2$ are determined. Procedure 2) Determine the relative refractive index differences $\Delta_i$ and the layer thicknesses $t_i$ (i=1 and 2) from equations (1)–(3) such that the geometrical birefringence due to the multilayer structure becomes a predetermined value. As for the procedure 1), when the fabrication accuracy of the multilayer structure is high, and only the geometrical birefringence due to the multilayer structure is present which is composed of stacked layers with different refractive indices without any new additional stress-induced birefringence, the mode solver can be used instead of fabricating the optical circuit.

Figure 1A:
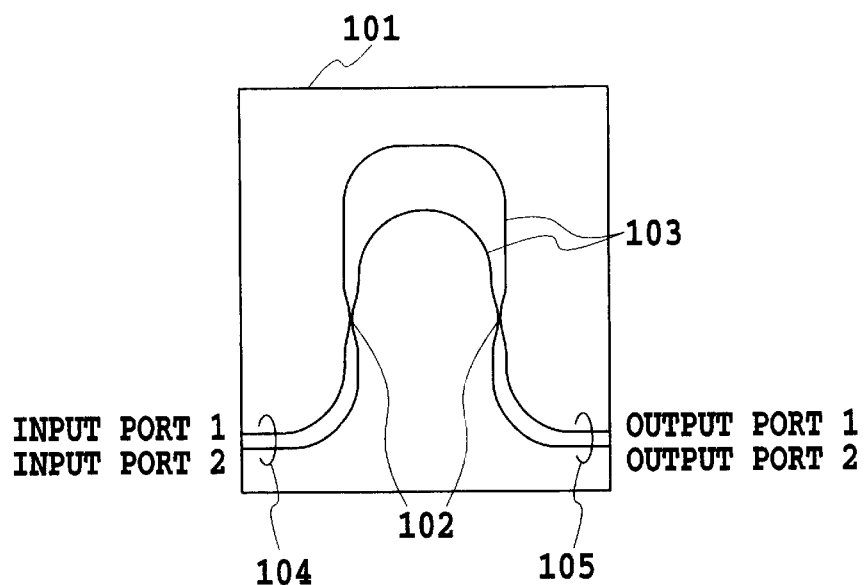
FIGS. 1A and 1B are diagrams showing a configuration of a Mach-Zehnder interferometer and that of an arrayed waveguide grating, respectively.

To determine the multilayer structure in the conditions that the average relative refractive index difference $\Delta_{ave}$ of the core is 0.75%, and the core dimension is 6 $\mu$m×6 $\mu$m, procedure 1) the Mach-Zehnder interferometer as shown in FIG. 1A was fabricated in the following three conditions of the relative refractive index differences $\Delta_i$ and the layer thicknesses $t_i$ (i=1 and 2) of the first core layer 703a and second core layer 703b. As for the number of layers, the total number of the layers is made nine, the number $N_1$ of the first core layers is made five and the number $N_2$ of second core layers is made four.

Figure 8A:
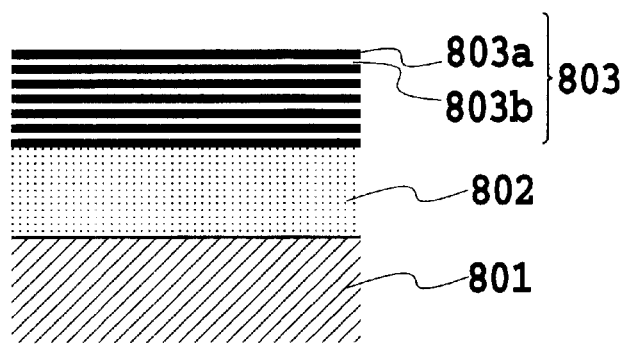
FIGS. 8A, 8B and 8C are cross-sectional views showing an example of the fabricating process of the optical waveguide of a first, second, third, fourth, fifth and eighth embodiments in accordance with the present invention.
Figure 8B:
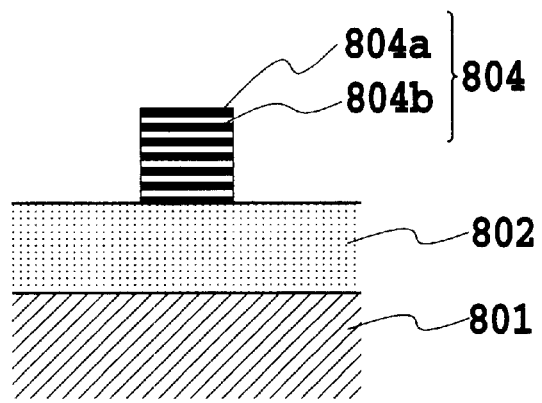
Figure 8C:
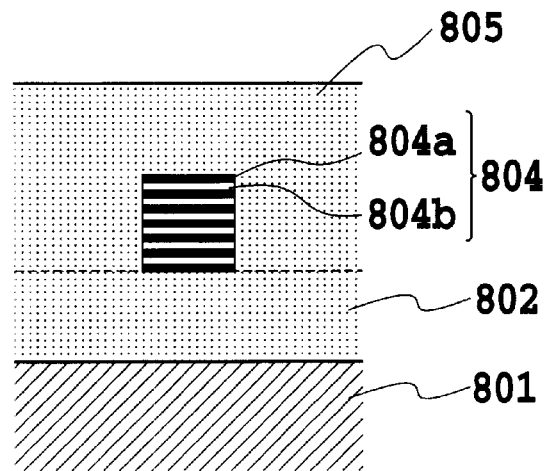

1) first core layer 703a, $\Delta_1$=1.0%, $t_1$=0.90 $\mu$m
   second core layer 703b, $\Delta_2$=0%, $t_2$=0.38 $\mu$m
2) first core layer 703a, $\Delta_1$=3.0%, $t_1$=0.29 $\mu$m
   second core layer 703b, $\Delta_2$=0%, $t_2$=1.14 $\mu$m
3) first core layer 703a, $\Delta_1$=5.1%, $t_1$=0.17 $\mu$m
   second core layer 703b, $\Delta_2$=0%, $t_2$=1.29 $\mu$m FIGS. 8A, 8B and 8C are process diagrams for fabricating the waveguide of the present embodiment.

First, as shown in FIG. 8A, a silicon substrate was used as a substrate 801, and then an under-cladding 802 and a core layer 803 composed of first core layer films 803a and second core layer films 803b which were stacked alternately were formed on the substrate 801 by flame hydrolysis deposition. The flame hydrolysis deposition is a method of forming glass particles mainly composed of $SiO_2$ from glass material gas mainly composed of $SiCl_4$ in the flame of an oxyhydrogen torch, thereby depositing a glass particle layer on the substrate. The deposited glass particle layer was heated by an electric furnace together with the substrate to form consolidated glass films. The glass particle layers for the first core layer films 803a were doped with $GeO_2$ to increase the refractive index. The amount of the doping was 10 mol % per 1% of the relative refractive index difference $\Delta$. In addition, $B_2O_3$ and $P_2O_5$ were added to drop the consolidation temperature.

As shown in FIG. 8B, a core ridge 804 was formed by removing unnecessary portions of the core layer 803 by the reactive ion etching. As shown in FIG. 8C, an over-cladding 804 was formed which had a refractive index equal to that of the under-cladding 802 in such a manner that it covered the core 804. To form the over-cladding 805, a glass particle layer was deposited again by the flame hydrolysis deposition, followed by heating in the electric furnace.

Figure 9:
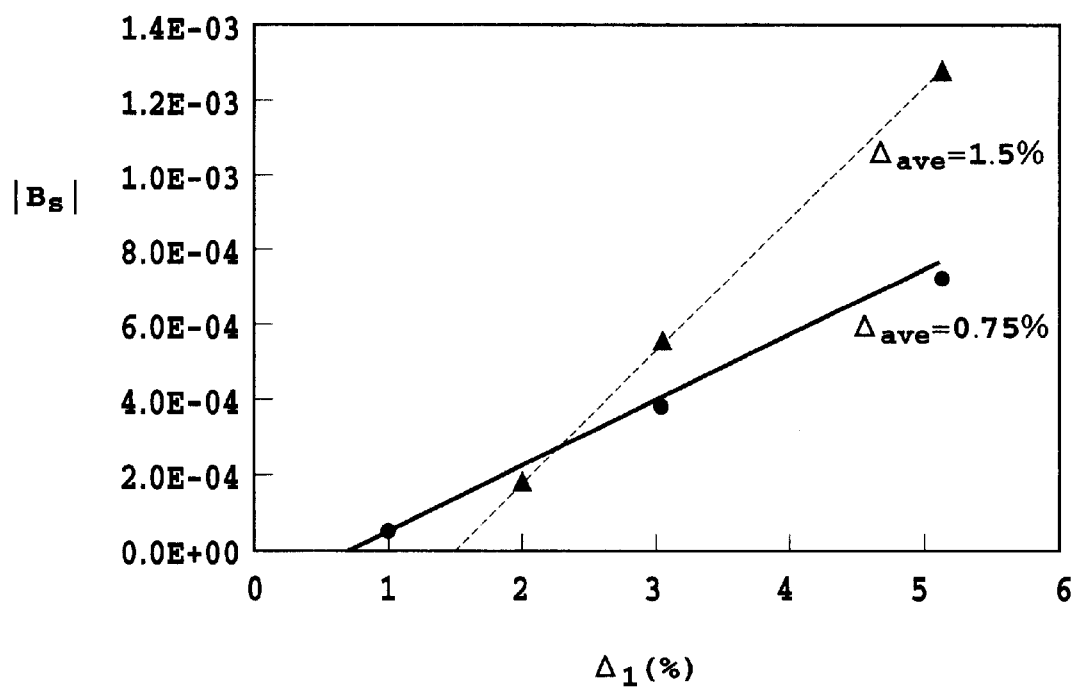
FIG. 9 is a graph illustrating an example of the magnitude $|B_s|$ of the birefringence due to the multilayer structure against the relative refractive index difference $\Delta_1$ of the first layer of the multilayer structure core of the first and third embodiments in accordance with the present invention.

The transmission spectra of the fabricated Mach-Zehnder interferometer were measured, and the birefringence value Be was estimated from the wavelength shift in the TE mode and TM mode, which was obtained from the transmission spectra. The geometrical birefringence $B_e$ due to the multilayer structure was obtained by subtracting from the $B_e$ the waveguide birefringence value $B_0 = 2.3 \times 10^{-4}$ caused by the conventional core structure. Closed circles of FIG. 9 represent the magnitude $|B_s|$ of the birefringence due to the multilayer structure. From the result and equations (1)–(3), the correction coefficient $c_1$ is set at 0.8 and $c_2$ zero. The solid line of FIG. 9 represents $|B_s|$ calculated from the correction coefficients and equations (1)–(3). The $|B_s|$ obtained in the procedure 2) for calculating the geometrical birefringence in the structure by the mode solver, was $3.8 \times 10^{-4}$, which was nearly equal to the calculation of FIG. 9.

Next, in the procedure 2), the relative refractive index differences $\Delta_i$ and layer thicknesses $t_i$ (i=1 and 2) of the first core layer 703a and second core layer 703b that will give $|B_s|=|B_0|=2.3 \times 10^{-4}$ were obtained from the correction coefficient $c_1$ of 0.8 and equations (1)–(3). Form the solid line of FIG. 9 representing the calculation result, the relative refractive index difference $\Delta_1$ of the first core layer 703a, at which $|B_s|=|B_0|=2.3 \times 10^{-4}$, was obtained as 2.0%, and the thicknesses $t_1$ and $t_2$ take the following values from equations (2) and (3).

first core layer 703a, $\Delta_1 = 2.0\%$, $t_1 = 0.44\ \mu m$, $N_1 = 5$ second core layer 703b, $\Delta_2 = 0\%$, $t_2 = 0.95\ \mu m$, $N_2 = 4$ It is seen from FIG. 9 that the values $|B_s|$ vary as a linear function of $\Delta_1$. Accordingly, the estimation can be made by obtaining $|B_s|$ for values $\Delta_1$ at several points by the procedure 1), by estimating an approximate line thereof, and by obtaining the values $\Delta_1$ corresponding to the predetermined $|B_s|$ from the approximate line.

Figure 1B:
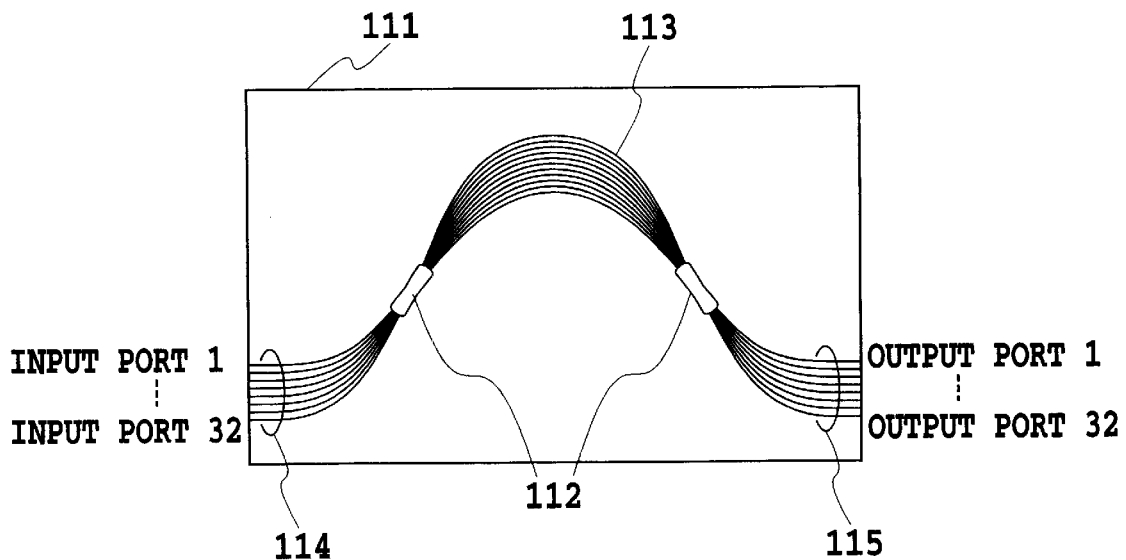

Using the multilayer structure, the Mach-Zehnder interferometer as shown in FIG. 1A and the arrayed waveguide grating as shown in FIG. 1B were fabricated. The slab waveguides 112 of the arrayed waveguide grating were formed in the same layer structure as the single-mode waveguide.

Figure 10:
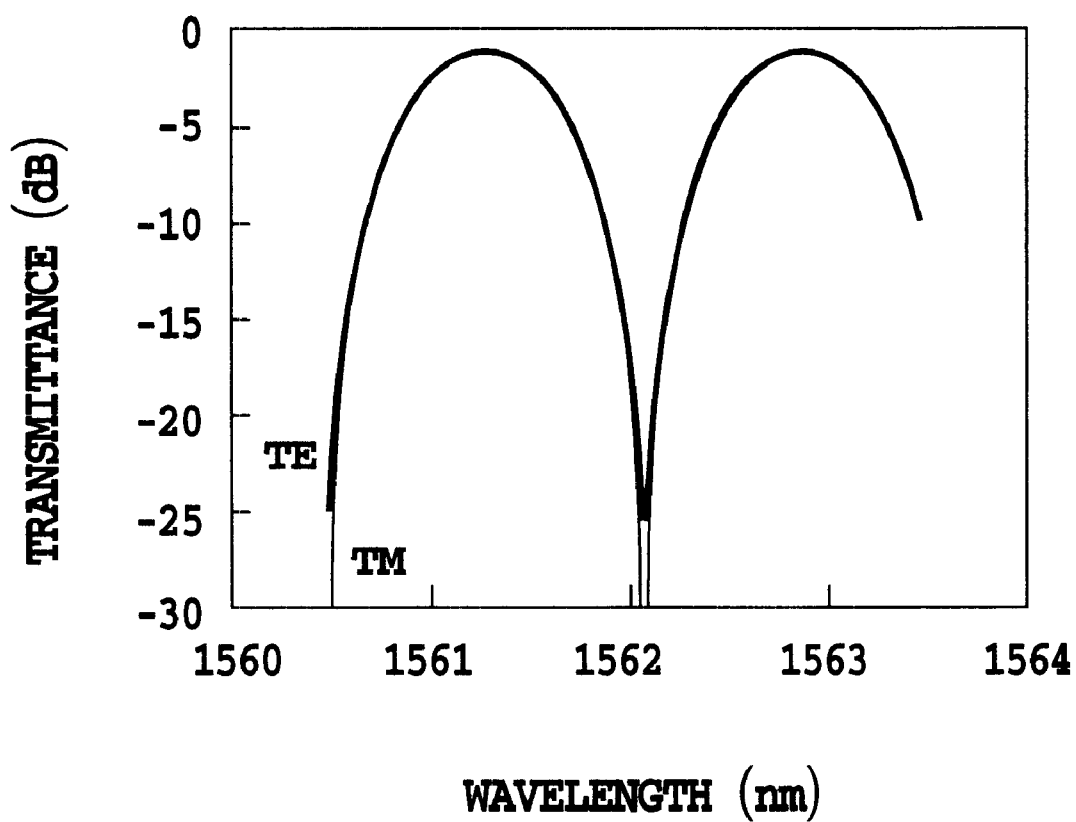
FIG. 10 is a graph illustrating an example of a transmission spectrum of a Mach-Zehnder interferometer in the first embodiment in accordance with the present invention.
Figure 11A:
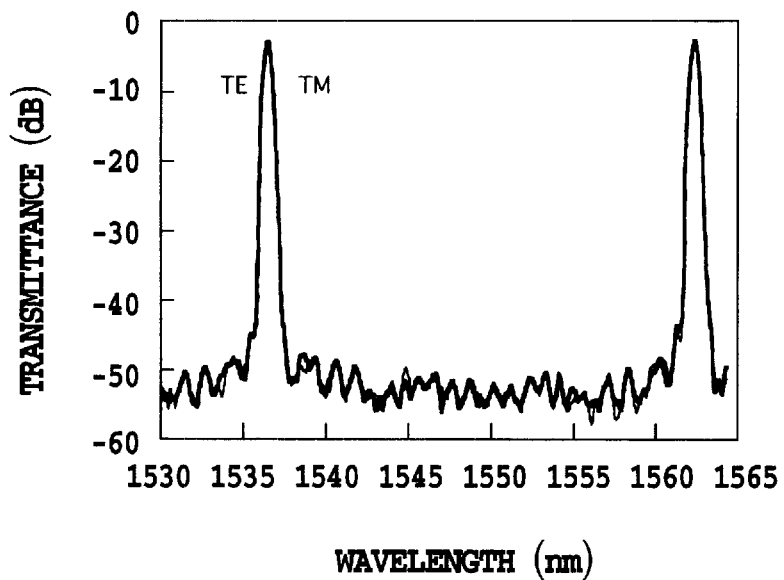
FIGS. 11A and 11B are graphs each illustrating an example of transmission spectra of an arrayed waveguide grating of the first embodiment in accordance with the present invention.
Figure 11B:
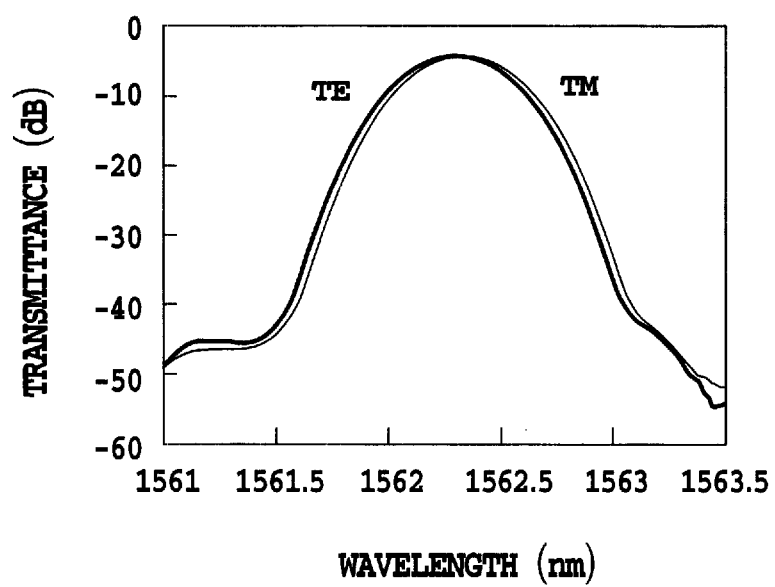

FIG. 10 is a graph illustrating the transmission spectra of the Mach-Zehnder interferometer, and FIGS. 11A and 11B are graphs illustrating the transmission spectra of the arrayed waveguide grating. The loss spectrum of the TE mode is nearly identical to that of the TM mode. The wavelength shift $\Delta_\lambda$ at the peak wavelengths at which the TE mode and TM mode have a minimum loss is less than 0.01 nm for the Mach-Zehnder interferometer, and less than 0.03 nm for the arrayed waveguide grating. The birefringence $B_e$ is estimated less than $3 \times 10^{-5}$ from the wavelength shift, which shows that the birefringence of the waveguide can be made small enough in the waveguide structure in accordance with the present invention. In addition, the loss difference between the two modes at the peak wavelengths is about 0.1 dB, which is much smaller than that of the conventional value of a few dB. Thus, it is seen that the polarization dependence of the optical waveguide circuit can be eliminated almost completely.

[Embodiment 2]

The second embodiment in accordance with the present invention is characterized by varying the number of layers of the core in a range of about ½–2 times that of the first embodiment.

As for the multilayer structure core 703 as shown in FIG. 7, which is a single-mode waveguide, the relative refractive index difference $\Delta_1$ of the first core layers 703a is set at 2.0%, and the relative refractive index difference $\Delta_2$ of the second core layers 703b is set at 0% so that the average relative refractive index difference $\Delta_{ave}$ becomes 0.75%, the core dimension becomes $6\ \mu m \times 6\ \mu m$, and the magnitude $|B_s|$ of the birefringence due to the multilayer structure becomes $2.3 \times 10^{-4}$ as in the embodiment 1. The arrayed waveguide grating as shown in FIG. 1B was fabricated with varying the number of layers $N_1$ of the first core layers in a range of two to 11 layers. The slab waveguides 112 of the arrayed waveguide grating were formed in the same layer structure as the single-mode waveguide. The number of layers $N_2$ of the second core layers is ($N_1 - 1$). The layer thickness $t_1$ of the first core layer 503a and the layer thickness $t_2$ of the second core layer 503b were set as follows.

$N_1=2$, $t_1=1.10\ \mu m$, $t_2=3.79\ \mu m$ $N_1=3$, $t_1=0.74\ \mu m$, $t_2=1.90\ \mu m$ $N_1=4$, $t_1=0.55\ \mu m$, $t_2=1.26\ \mu m$ $N_1=5$, $t_1=0.44\ \mu m$, $t_2=0.95\ \mu m$ $N_1=6$, $t_1=0.37\ \mu m$, $t_2=0.76\ \mu m$ $N_1=7$, $t_1=0.32\ \mu m$, $t_2=0.63\ \mu m$ $N_1=8$, $t_1=0.28\ \mu m$, $t_2=0.54\ \mu m$ $N_1=9$, $t_1=0.25\ \mu m$, $t_2=0.47\ \mu m$ $N_1=10$, $t_1=0.22\ \mu m$, $t_2=0.42\ \mu m$ $N_1=11$, $t_1=0.20\ \mu m$, $t_2=0.38\ \mu m$

The fabricating process of the waveguide is the same as that of the first embodiment.

Figure 12:
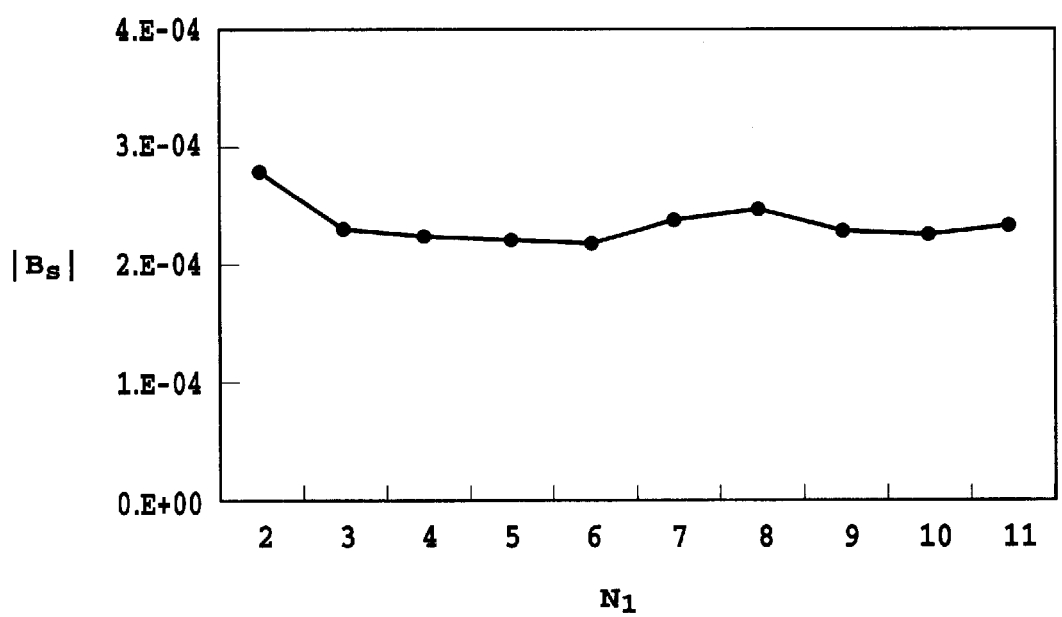
FIG. 12 is a graph illustrating an example of the magnitude $|B_s|$ of the birefringence due to the multilayer structure against the number $N_1$ of layers of the first layer of the multilayer structure core in the second embodiment in accordance with the present invention.

FIG. 12 illustrates the magnitude of the geometrical birefringence $|B_s|$ due to the multilayer structure estimated from the wavelength shift of the transmission spectra measured. When $N_1$ is two, $|B_s|$ is greater than the predetermined value by an amount of $5 \times 10^{-5}$, and both the circuit loss and connection loss with an ordinary optical fiber increase slightly. This is because the waveform distortion is greater in this case than in the distribution of the electromagnetic field of the conventional structure. In contrast, when the total number of the layers is equal to or greater than five, it is seen that the value $|B_s|$ is set within an error of $2 \times 10^{-5}$ from the predetermined $|B_s|$. In addition, although the conventional structure has a connection loss with an ordinary optical fiber of about 0.4 dB, the present embodiment can reduce it by about 0.15 dB when $N_1$ is 3–6, by about 0.1 dB when $N_1$ is 7 or 8, and by about 0.05 dB when $N_1$ is 9–11. Thus, selecting an appropriate number of layers can reduce the connection loss. Accordingly, to reduce the birefringence of the waveguide sufficiently, and to eliminate almost all the polarization dependence of the optical waveguide circuit, the total number of the layers is preferably set at five or more.

[Embodiment 3]

The third embodiment in accordance with the present invention is characterized in that the average relative refractive index difference of the core is increased than that of the first embodiment.

The multilayer structure core 703 as shown in FIG. 7, a single-mode waveguide, was formed such that it had the average relative refractive index difference $\Delta_{ave}$ of 1.5% and the core dimension of $4\ \mu m \times 4\ \mu m$, and the arrayed waveguide grating as shown in FIG. 1B was fabricated using the multilayer structure core. The slab waveguides 112 of the arrayed waveguide grating was formed in the same layer structure as the single-mode waveguide. To set the magnitude $|B_s|$ of the birefringence due to the multilayer structure at $2.3 \times 10^{-4}$, the relative refractive index difference $\Delta_i$, layer thicknesses $t_i$ and the numbers of layers $N_i$ of the individual layers were set at the following values from equations (1)–(3) and correction coefficients $c_1 = 0.8$ and $c_2 = 0$. The correction coefficients $c_1$ and $c_2$ were those obtained in the embodiment 1.

first core layer 703a, $\Delta_1$=2.25%, $t_1$=0.56 μm, $N_1$=5
second core layer 703b, $\Delta_2$=0%, $t_2$=0.30 μm, $N_2$=4

The fabricating process of the waveguide was the same as that of the first embodiment.

It is seen from the transmission spectra of the arrayed waveguide grating fabricated that the wavelength shift of the TE mode is −0.02 nm which is greater than that of the TM mode, and that the birefringence can be reduced to $2\times10^{-5}$. In addition, the connection loss with an ordinary optical fiber is less than that of the conventional structure by 0.2 dB.

Although the coefficients $c_1$ and $c_2$ obtained in the first embodiment are used for the correction here, the Mach-Zehnder interferometer as shown in FIG. 1A was fabricated using the following three types of the multilayer structures as in the embodiment 1, and the correction coefficients $c_1$ and $c_2$ were estimated from their transmission spectra. The number of layers $N_1$ of the first core layer was made five, the number of layers $N_2$ of the second core layer four, and hence the total number of the layers was nine.

1) first core layer 703a, $\Delta_1$=2.02%, $t_1$=0.60 μm
   second core layer 703b, $\Delta_2$=0%, $t_2$=0.26 μm
2) first core layer 703a, $\Delta_1$=3.05%, $t_1$=0.39 μm
   second core layer 703b, $\Delta_2$=0%, $t_2$=0.51 μm
3) first core layer 703a, $\Delta_1$=5.13%, $t_1$=0.23 μm
   second core layer 703b, $\Delta_2$=0%, $t_2$=0.72 μm In FIG. 9, solid triangles represent the magnitude of the geometrical birefringence $|B_s|$ of the multilayer structure estimated from the transmission spectra of the Mach-Zehnder interferometer fabricated. Comparing the result with equations (1)–(3), $c_1$ is estimated at 0.78, and $c_2$ at $3\times10^{-5}$. The calculation result by equations (1)–(3) is represented by the broken line in FIG. 9. These values are nearly the same as the values $c_1$=0.8 and $c_2$=0 which are estimated in the first embodiment. At $\Delta_1$=2.25% of the present embodiment, the value $|B_s|$ estimated by the calculation is $2.5\times10^{-4}$ which corresponds to the wavelength shift of the arrayed waveguide grating fabricated.

Thus, as for the single-mode waveguide structures with different average relative refractive index difference and dimensions, when considering the effect of fabrication error, it is preferable to estimate the correction coefficients $c_1$ and $c_2$ in the procedure 1). When the degree of the confinement is nearly the same (about the same V parameters) as in the first embodiment and the present embodiment, the birefringence of the waveguide can be sufficiently reduced even though the values already estimated are used. Thus, it is seen that the polarization dependence of the optical waveguide circuit can be almost eliminated.

[Embodiment 4]

The fourth embodiment in accordance with the present invention is characterized in that the cladding is formed using silica-based glass, the magnitude of the waveguide birefringence $|B_0|$ of which is $1.1\times10^{-4}$, about half that of the third embodiment, the waveguide birefringence being that of the conventional core structure. In addition, the relative refractive index difference $\Delta_2$ of the second core layer 703b is made nonzero.

The multilayer structure core 703 as shown in FIG. 7, a single-mode waveguide, was formed such that it had the average relative refractive index difference $\Delta_{ave}$ of 1.5% and the core dimension of 4 μm×4 μm, and the arrayed waveguide grating as shown in FIG. 1B was fabricated using the single-mode waveguide. The slab waveguides 112 of the arrayed waveguide grating were formed in the same layer structure as the single-mode waveguide described below. To set the magnitude $|B_s|$ of the birefringence due to the multilayer structure at $1.2\times10^{-4}$, the relative refractive index differences $\Delta_i$, layer thicknesses $t_i$ and the numbers of layers $N_i$ of the individual layers were set at the following values from equations (1)–(3) in which the correction coefficients were placed at $c_1$=0.8 and $c_2$=0. The correction coefficients $c_1$ and $c_2$ were those obtained in the embodiment 1.

first core layer 703a, $\Delta_1$=1.91%, $t_1$=0.42 μm, $N_1$=7
second core layer 703b, $\Delta_2$=0.37%, $t_2$=0.18 μm, $N_2$=6

The fabricating process of the waveguide was the same as that of the first embodiment.

It is seen from the transmission spectra of the arrayed waveguide grating fabricated that the wavelength shift is 0.01 nm, and that the birefringence can be reduced to $1\times10^{-5}$. Thus, it is seen that the birefringence can be reduced regardless of the magnitude $|B_0|$ of the waveguide birefringence in the conventional core structure. In addition, the multilayer structure different from that of the third embodiment can be selected.

[Embodiment 5]

The fifth embodiment in accordance with the present invention is characterized in that three types of layers with different relative refractive index differences are stacked alternately to form a multilayer core structure.

Figure 13:
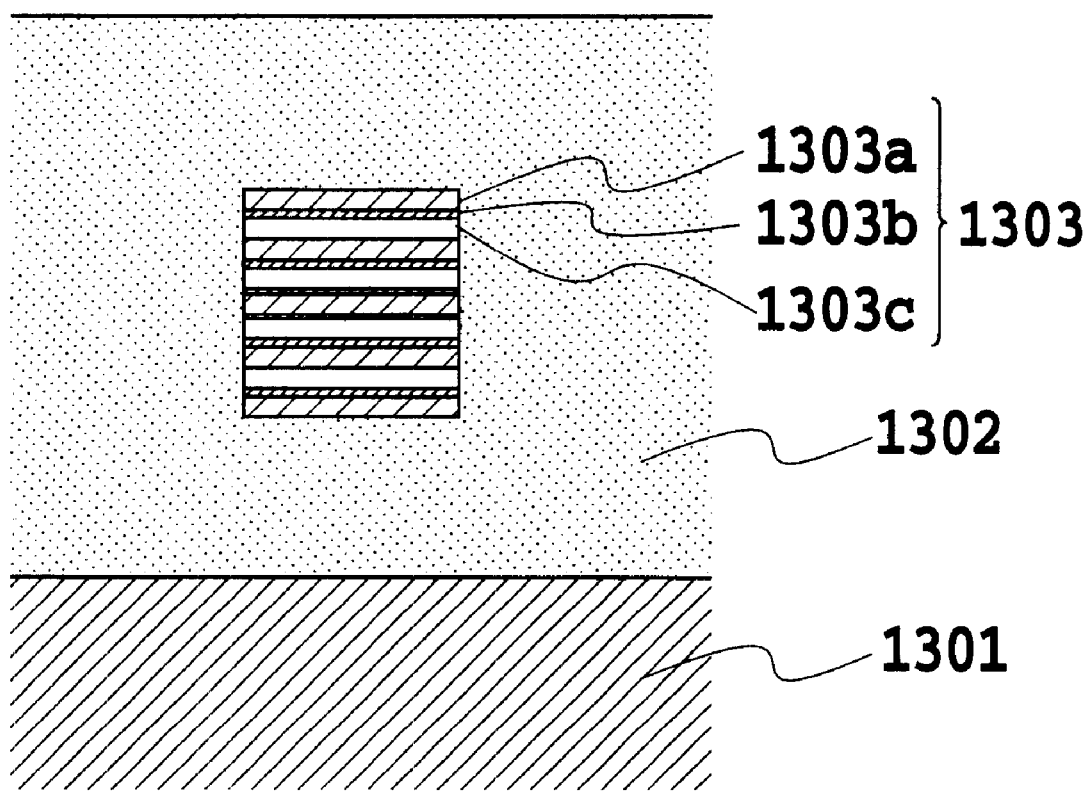
FIG. 13 is a cross-sectional view showing an optical waveguide of the fifth embodiment in accordance with the present invention.

FIG. 13 is a cross-sectional view of a single-mode waveguide of the present embodiment. It employs a silicon substrate as a substrate 1301, and silica-based glass as a cladding 1302 and a core 1303. The core 1303 is composed of first core layers 1303a, second core layers 1303b, and third core layers 1303c. Specifically, it has a structure in which these layers are stacked over the substrate in the order of the first core layer 1303a, second core layer 1303b, third core layer 1303c, first core layer 1303a, second core layer 1303b, third core layer 1303c, second core layer 1303b with half the thickness, first core layer 1303a, second core layer 1103b with half the thickness, third core layer 1103c, second core layer 1303b, first core layer 1303a, third core layer 1303c, second core layer 1303b, and first core layer 1303a. The individual layers are stacked symmetrically with respect to the center layer of the core.

Four types of Mach-Zehnder interferometers with the following thicknesses are fabricated to confirm that the multilayer structure can be designed using equations (1)–(3) in which the correction coefficients are placed at $c_1$=0.8 and $c_2$=0, under the conditions that the average relative refractive index difference $\Delta_{ave}$ of the core is 0.75%, the core dimension is 6 μm×6 μm, the relative refractive index difference $\Delta_1$ of the first core layer 1303a is 3%, the relative refractive index difference $\Delta_2$ of the second core layer 1303b is 0.75%, and the relative refractive index difference $\Delta_3$ of the third core layer 1303c is 0%. The fabricating process of the waveguide is the same as that of the first embodiment.

1) first core layer 1303a, $\Delta_1$=3.0%, $t_1$=0.11 μm
   second core layer 1303b, $\Delta_2$=0.75%, $t_2$=0.76 μm
   third core layer 1303c, $\Delta_3$=0%, $t_3$=0.42 μm
2) first core layer 1303a, $\Delta_1$=3.0%, $t_1$=0.16 μm
   second core layer 1303b, $\Delta_2$=0.75%, $t_2$=0.56 μm
   third core layer 1303c, $\Delta_3$=0%, $t_3$=0.60 μm
3) first core layer 1303a, $\Delta_1$=3.0%, $t_1$=0.20 μm
   second core layer 1303b, $\Delta_2$=0.75%, $t_2$=0.37 μm
   third core layer 1303c, $\Delta_3$=0%, $t_3$=0.79 μm
4) first core layer 1303a, $\Delta_1$=3.0%, $t_1$=0.25 μm
   second core layer 1303b, $\Delta_2$=0.75%, $t_2$=0.17 μm
   third core layer 1303c, $\Delta_3$=0%, $t_3$=0.97 μm The geometrical birefringence due to the multilayer structure $|B_s|$ was estimated from the wavelength shift obtained from the transmission spectra of the Mach-Zehnder interferometer fabricated.

Figure 14:
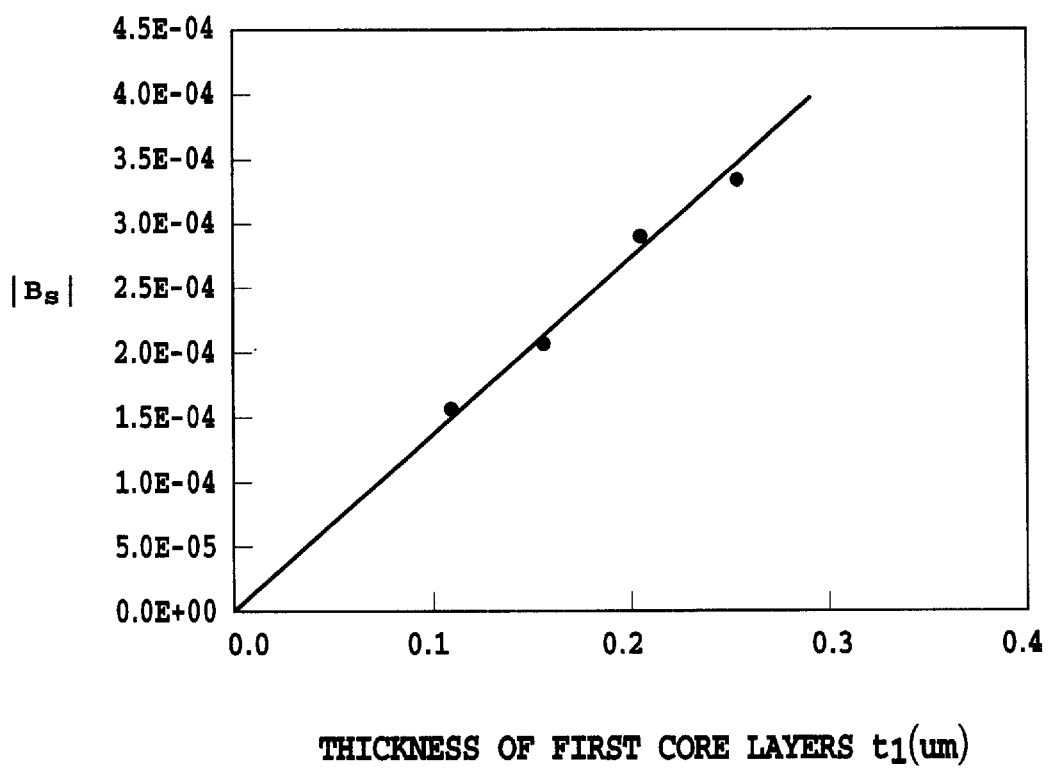
FIG. 14 is a graph illustrating an example of the magnitude $|B_s|$ of the birefringence due to the multilayer structure against the thickness $t_1$ of the first layer of the multilayer structure core in the fifth embodiment in accordance with the present invention.

In FIG. 14, closed circles are the values $|B_s|$ plotted against the thickness $t_1$ of the first core layer. The solid line is a result of the calculation using equations (1)–(3) in which the correction coefficients are placed at $c_1=0.8$ and $c_2=0$, which matches well with the values $|B_s|$ estimated from the wavelength shift.

Using it, the thicknesses of the individual layers at which the geometrical birefringence due to the multilayer structure $|B_s|$ became $2.3\times10^{-4}$ were set as follows using equations (1)–(3) in which the correction coefficients were placed at $c_1=0.8$ and $c_2=0$, and the arrayed waveguide grating as shown in FIG. 1B was fabricated. The slab waveguides 112 of the arrayed waveguide grating were formed in the same layer structure as that of the single-mode waveguide described below. The fabricating process was the same as that of the first embodiment.

first core layer 1303a, $\Delta_1=3\%$, $t_1=0.17$ μm, $N_1=5$ second core layer 1303b, $\Delta_2=0.75\%$, $t_2=0.51$ μm, $N_2=6$ (thickness of second core layer 1303b with half thickness is 0.26 μm, and $N_2=6$ includes two layers with half thickness)

third core layer 1303c, $\Delta_3=0\%$, $t_3=0.65$ μm, $N_3=4$

It was confirmed from the transmission spectra of the arrayed waveguide grating fabricated that the wavelength shift was 0.01 nm, and the birefringence could be reduced to $1\times10^{-5}$, and that the optical waveguide circuit with its polarization dependence eliminated could be implemented by alternately stacking the layers with different three relative refractive index differences.

Constructing the multilayer structure by alternately stacking the three types of layers with different relative refractive index differences can increase the flexibility of selecting the film thicknesses and relative refractive index differences than in the multilayer structure formed by stacking two types of layers with different relative refractive index differences. The average relative refractive index difference of the core and the geometrical birefringence $|B_s|$ due to the multilayer structure are mainly determined by the relative refractive index differences and thicknesses of the layers constituting the multilayer structure. Here, the number of layers is assumed to be fixed.

The parameters, which define the multilayer structure composed of two types of alternate layers, consist of two relative refractive index differences and two film thicknesses. When one of the four parameters is determined, the other three parameters are determined automatically because the average relative refractive index difference and the geometrical birefringence $|B_s|$ have been determined. On the other hand, as for the multilayer structure composed of three types of alternate layers, there are six types of parameters that define it. Thus, deciding three of the parameters determines the other three parameters because the average relative refractive index difference and $|B_s|$ have been determined.

Therefore, as for the two types of alternate layers, for example, since the relative refractive index difference of the second core layers is set at first as in the first to fourth embodiments, the relative refractive index difference of the first core layers, the thickness of the first core layers and that of the second core layers are determined automatically. In contrast, as for the three types of alternate layers as in the present embodiment, determining the relative refractive index differences of the individual layers will automatically determine the thicknesses of the individual layers. Accordingly, the relative refractive index differences are selectable appropriately. When there is a parameter the fabrication accuracy of which is difficult to achieve as in the case where only three relative refractive index differences of the present embodiment are applicable, only if the film thicknesses are formed at high accuracy, appropriate geometrical birefringence can be implemented, thereby reducing the birefringence.

Another advantage of the multilayer structure composed of the three types of alternate layers is that it can bring about photorefractive effect efficiently in the silica-based optical waveguide.

This is because the silica-based glass heavily doped with $GeO_2$ can achieve high photorefractive index, and the multilayer structure composed of three types of alternate layers can achieve layers that are heavily doped with $GeO_2$ more easily than the multilayer structure composed of the two types of layers. The advantage increases with the number of types of the alternate layers.

[Embodiment 6]

Figure 15:
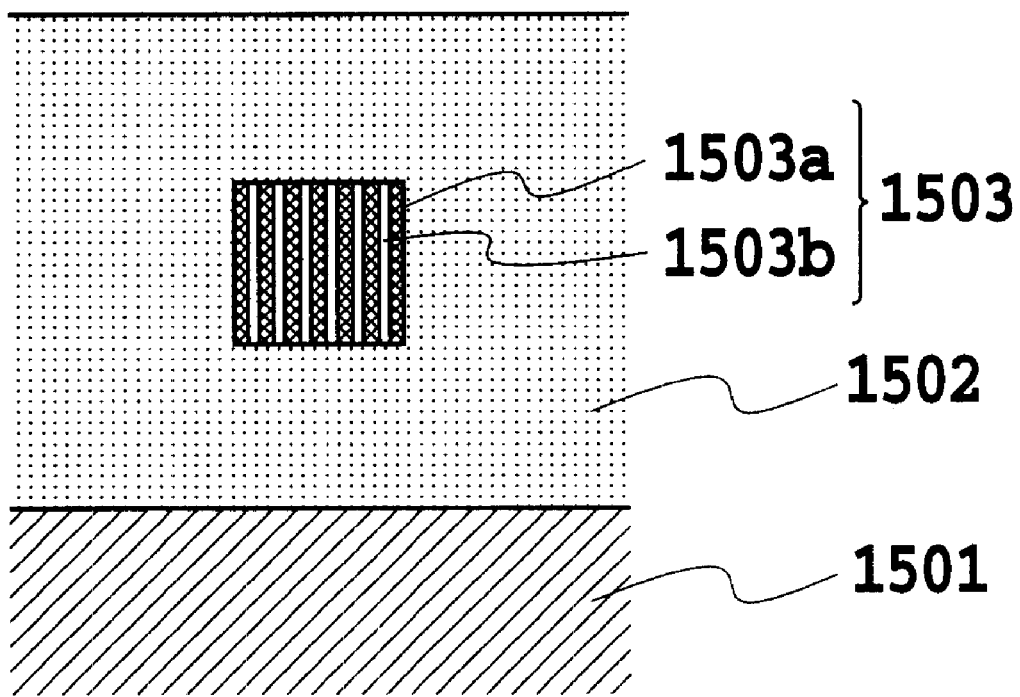
FIG. 15 is a cross-sectional view of an optical waveguide of a sixth embodiment in accordance with the present invention.

The sixth embodiment in accordance with the present invention is characterized in that it uses a silica substrate as a substrate 1501, and that the multilayer structure is composed of parallel layers which are perpendicular to the surface of the substrate as shown in the cross section of the single-mode waveguide in FIG. 15. A cladding 1502 and a core 1503 are composed of silica-based glass. The core 1503 has a multilayer structure composed of a first core layers 1503a and a second core layers 1503b, in which the layers perpendicular to the surface of the substrate are stacked alternately in the direction parallel to the surface of the substrate. Thus, the layers are approximately parallel to the traveling direction of light. In other words, they are nearly parallel to the side surface of the optical waveguide.

Figure 2:
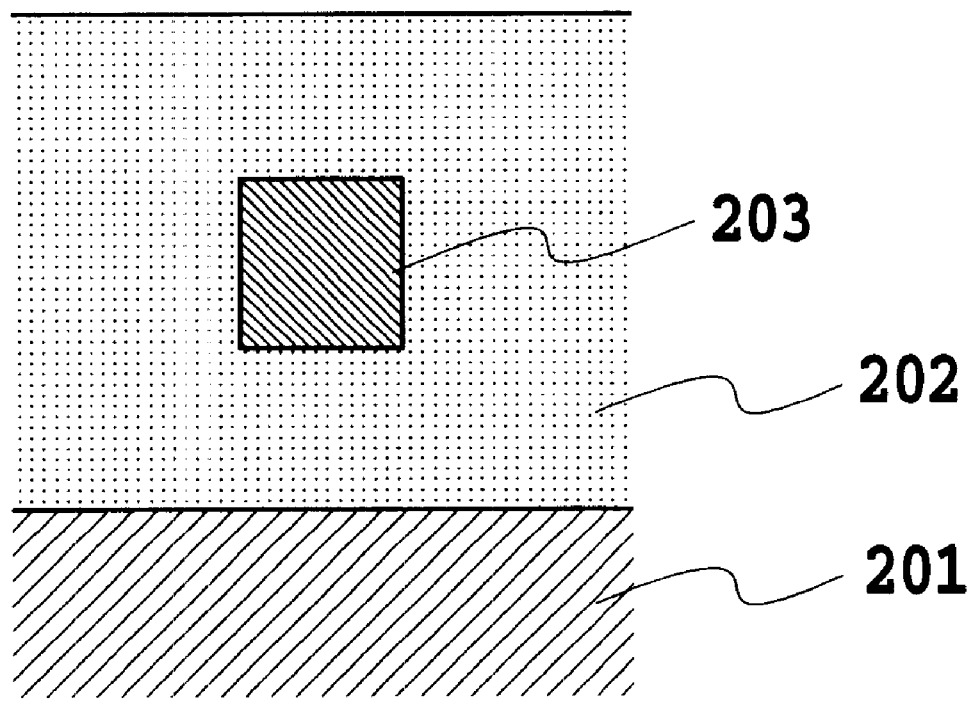
FIG. 2 is a cross-sectional view of a conventional optical waveguide.
Figure 3:
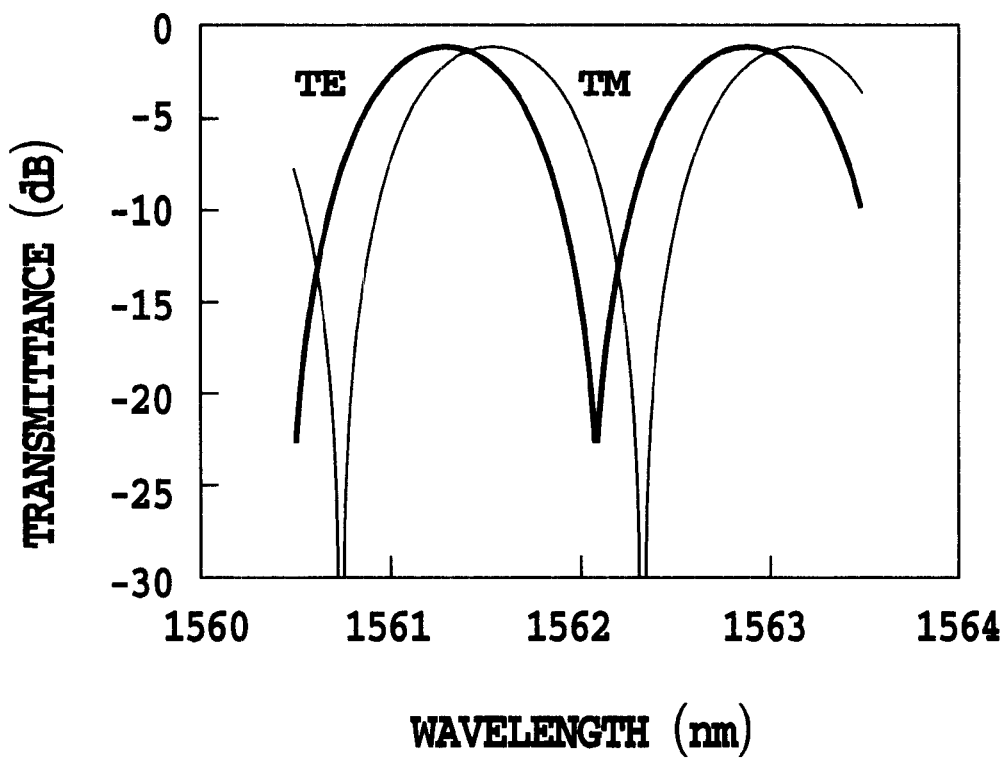
FIG. 3 is a graph illustrating transmission spectra of a conventional Mach-Zehnder interferometer.
Figure 4A:
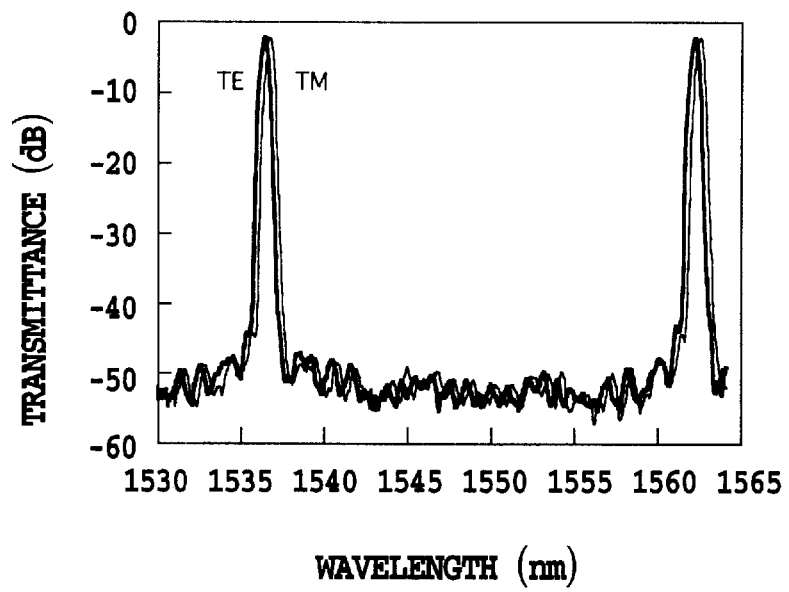
FIGS. 4A and 4B are graphs illustrating transmission spectra of a conventional arrayed waveguide grating.
Figure 4B:
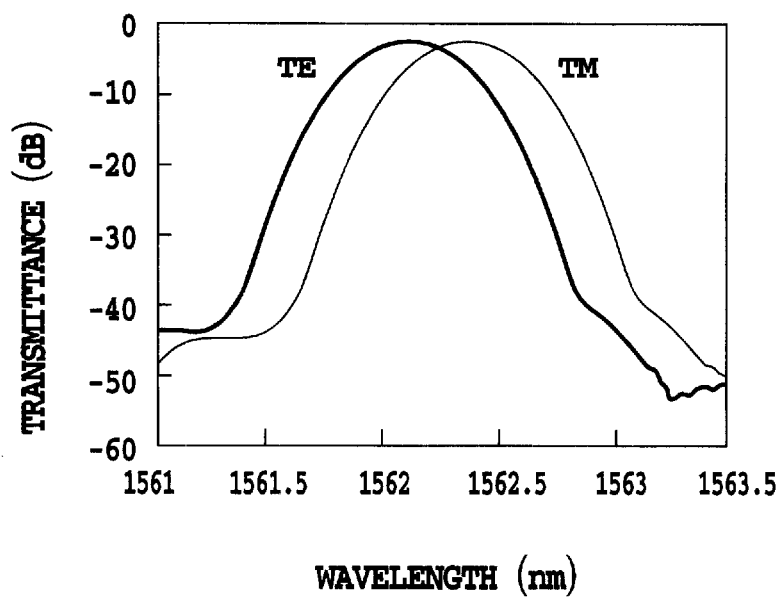
Figure 5A:
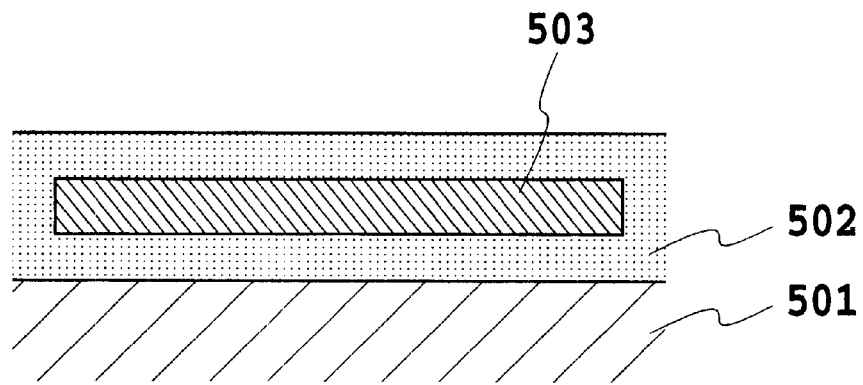
FIGS. 5A and 5B are cross-sectional views showing a conventional slab waveguide and waveguide array, respectively.
Figure 5B:
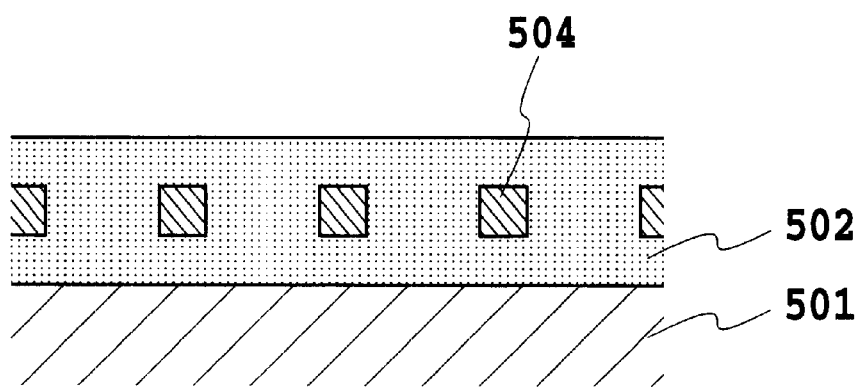
Figure 6:
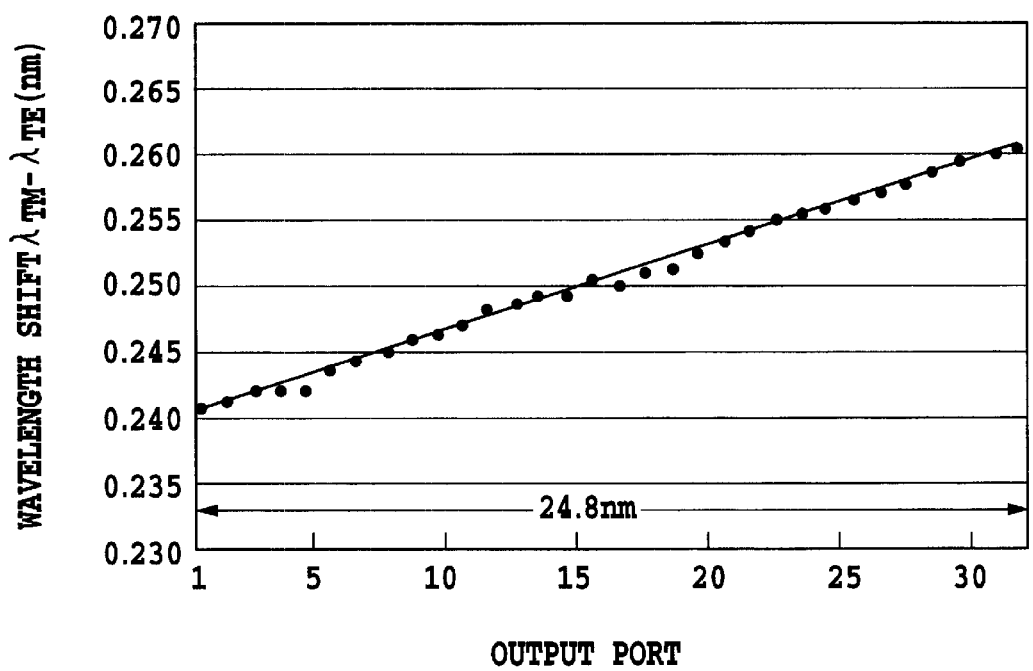
FIG. 6 is a graph illustrating the wavelength shift at the output ports of the conventional arrayed waveguide grating.

When fabricating on a silica substrate an optical waveguide which has the conventional structure as shown in FIG. 2, the effective refractive index of the TM mode becomes smaller than that of the TE mode reversely to the foregoing embodiments, and the birefringence value $B_0$ becomes a negative value $-2.1\times10^{-4}$. This is due to the tensile stress imposed on the optical waveguide. As for the transmission spectra of the arrayed waveguide grating as shown in FIG. 1B, the transmission spectrum of the TE mode shifts to the longer wavelength side compared with that of the TM mode. Therefore, to reduce the waveguide birefringence, the core 1503 is provided with the multilayer structure that is composed of the layers which are perpendicular to the surface of the substrate and stacked in the direction parallel to the substrate, and that provides geometrical birefringence which will make the effective refractive index of the TM mode higher than that of the TE mode.

Figure 16A:
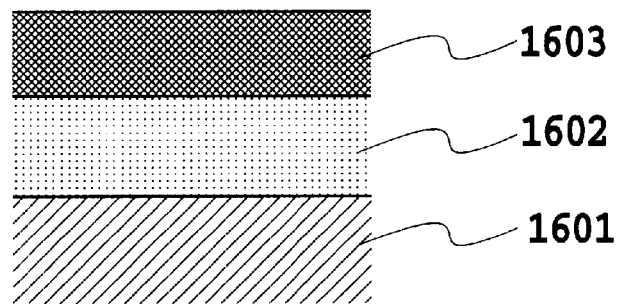
FIGS. 16A, 16B and 16C are cross-sectional views showing an example of the fabricating process of the optical waveguide of the sixth embodiment in accordance with the present invention.
Figure 16B:
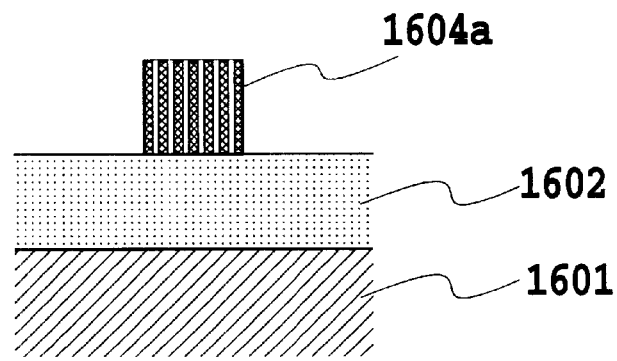
Figure 16C:
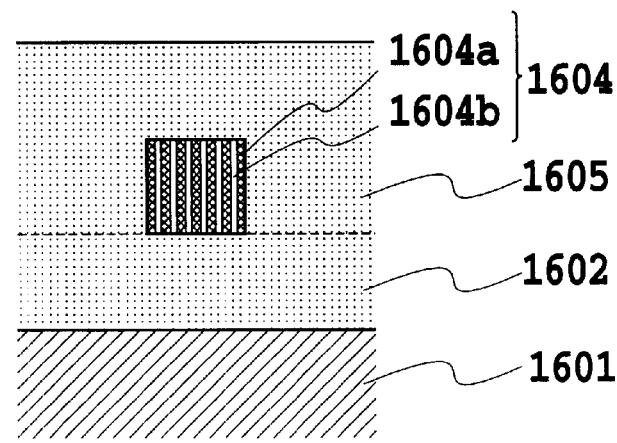

The multilayer structure core 1503 as shown in FIG. 15 was formed such that it had the average relative refractive index difference $\Delta_{ave}$ of 0.75% and the core dimension of 6 μm×6 μm. To set the magnitude $|B_s|$ of the birefringence due to the multilayer structure at $2.1\times10^{-4}$, the relative refractive index differences $\Delta_i$, layer thicknesses $t_i$ and the numbers of layers $N_1$ of the individual layers were set at the following values from equations (1)–(3) in which the correction coefficients were placed at $c_1=0.8$ and $c_2=0$. The correction coefficients $c_1$ and $c_2$ were those obtained in the embodiment 1. In addition, the arrayed waveguide grating as shown in FIG. 1B was fabricated. The slab waveguides 112 of the arrayed waveguide grating were formed in the same layer structure as the single-mode waveguide described below, and the layers were formed approximately in parallel with the direction connecting the center of the input/output waveguides and the center of the waveguide array.

first core layers 1503a, $\Delta_1=2.0\%$, $t_1=0.75$ μm, $N_1=3$ second core layers 1503b, $\Delta_2=0\%$, $t_2=1.88$ μm, $N_2=2$ FIGS. 16A, 16B and 16C are process diagrams illustrating steps of fabricating the waveguide of the present embodiment. First, as shown in FIG. 16A, a silica substrate was used as a substrate 1601, and then a glass particle layer for an under-cladding 1602 and a glass particle layer for a first core layers 1604a were deposited on the substrate 1601 by the flame hydrolysis deposition, followed by consolidation in an electric furnace. Subsequently, as shown in FIG. 16B, strip-like first core layers 1604a were formed by removing unnecessary portions of the first core layer film 1603 by the reactive ion etching. Next, as shown in FIG. 16C, an over-cladding 1605 was formed which had a refractive index equal to that of the under-cladding 1602 in such a manner that it covered the first core layers 1604a. To form the over-cladding 1605, a glass particle layer was deposited again by the flame hydrolysis deposition, followed by heating in the electric furnace. By forming the over-cladding 1605, the strip-like first core layers 1604a were buried. Thus, the second core layers 1604b were formed, thereby forming the core 1604 with a multilayer structure.

It is found from the transmission spectra of the arrayed waveguide grating fabricated that the wavelength shift of the TE mode is 0.05 nm with respect to the TM mode, that the birefringence can be reduced to about $5 \times 10^{-5}$ regardless of the sign of the birefringence, and that the polarization dependence of the optical waveguide circuit can be reduced.

Figure 17:
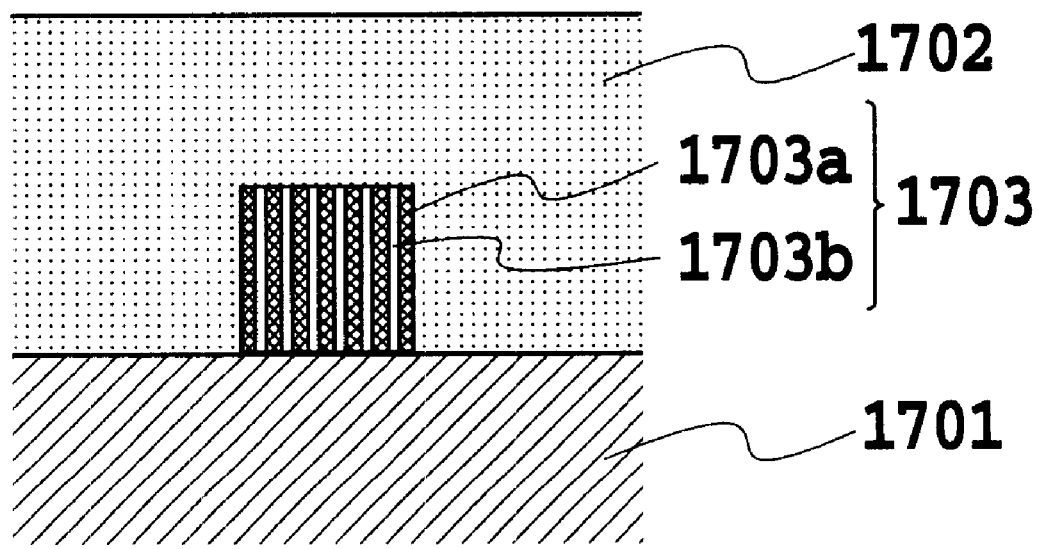
FIG. 17 is a cross-sectional view of another optical waveguide of the sixth embodiment in accordance with the present invention.

Although the multilayer structure is applied to the structure that comprises the cladding between the substrate 1501 and the core 1503 as shown in FIG. 15 in the present embodiment, since the substrate consists of the silica substrate, the multilayer structure is also applicable to the structure as shown in FIG. 17, which uses the substrate as the cladding.

[Embodiment 7]

Figure 18:
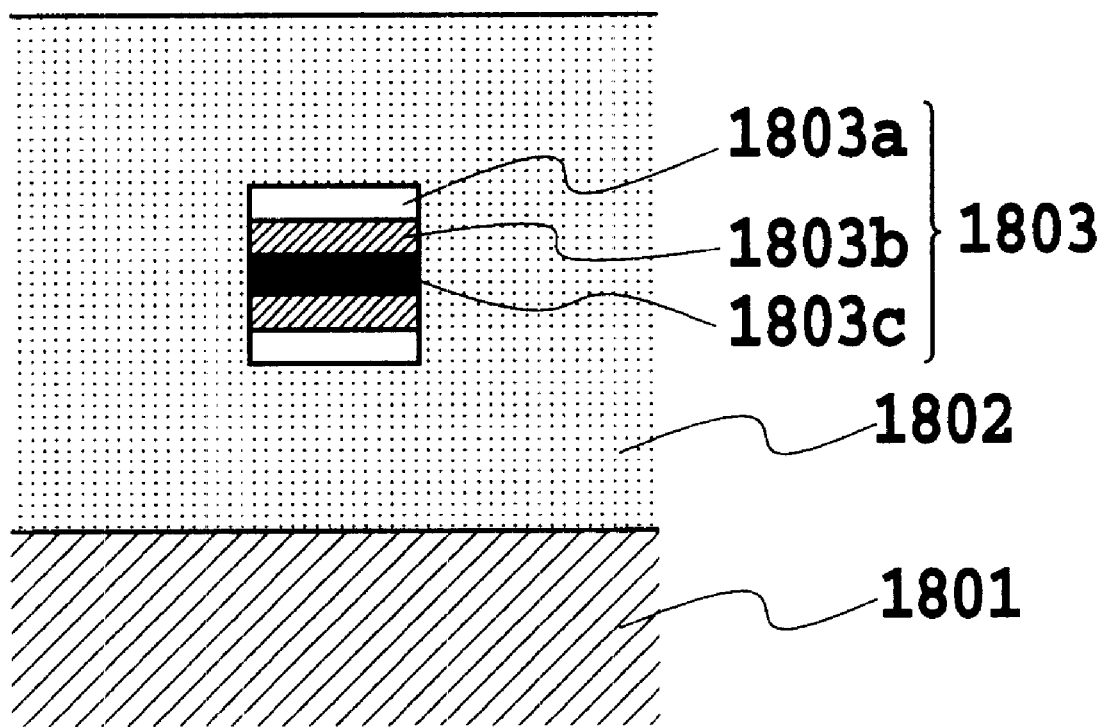
FIG. 18 is a cross-sectional view of another optical waveguide of a seventh embodiment in accordance with the present invention.

The seventh embodiment in accordance with the present invention has a graded-index multilayer structure, the refractive index of which increases from the end layers of the core at the cladding side to the central layer of the core. FIG. 18 shows a cross section of a single-mode waveguide of the present embodiment with a graded-index multilayer structure. Its substrate 1801 consists of a silicon, and its cladding 1802 and core 1803 are composed of silica-based glass. The core 1803 has a multilayer structure with five layers in total, in which first core layers 1803a and second core layers 1803b are disposed symmetrically on both side of a third core layer 1803c, the central core layer. Their refractive indices increase in the progressive order of the first core layers 1803a, second core layers 1803b, and third core layer 1803c.

The arrayed waveguide grating as shown in FIG. 1B was fabricated in the following setting in two types of structures, the average relative refractive index differences $\Delta_{ave}$ of which were 0.75% and 1.5%, respectively. The slab waveguides 112 of the arrayed waveguide grating were formed in the same layer structure as that of the single-mode waveguide.

As for the multilayer structure core 1803 with the average relative refractive index difference $\Delta_{ave}$ of 0.75%, the core dimension was made 6 μm×6 μm, and the individual layers were formed as follows:

first core layers 1803a, $\Delta_1$=0.45%, $t_1$=1.0 μm
second core layers 1803b, $\Delta_2$=0.75%, $t_2$=1.2 μm
third core layer 1803c, $\Delta_3$=1.1%, $t_3$=1.6 μm As for the multilayer structure core 1803 with the average relative refractive index difference $\Delta_{ave}$ of 1.5%, the core dimension was made 4 μm×4 μm, and the individual layers were formed as follows:

first core layers 1803a, $\Delta_1$=1.1%, $t_1$=0.8 μm
second core layers 1803b, $\Delta_2$=1.5%, $t_2$=0.9 μm
third core layer 1803c, $\Delta_3$=2.0%, $t_3$=1.1 μm The fabricating process was the same as that of the first embodiment. The cladding was formed by silica-based glass, the magnitude $|B_0|$ of the waveguide birefringence of which was $1.1 \times 10^{-4}$ in the conventional core structure as in the fourth embodiment.

It was confirmed from the transmission spectra of the arrayed waveguide grating fabricated that the wavelength shift was 0.02 nm for the average relative refractive index difference $\Delta_{ave}$ of 0.75%, and 0.01 nm for the average relative refractive index difference $\Delta_{ave}$ of 1.5%, that the birefringence $|B_e|$ could be reduced to $2 \times 10^{-5}$ and $1 \times 10^{-5}$, respectively, that the waveguide birefringence could be reduced even in the graded-index layer structure, and that the polarization dependence of the optical waveguide circuit could be reduced.

The magnitude $|B_s|$ of the geometrical birefringence due to the multilayer structure, which was estimated by the mode solver, was $2.2 \times 10^{-5}$ for the average relative refractive index difference $\Delta_{ave}$ of 0.75%, and $6.3 \times 10^{-5}$ for the average relative refractive index difference $\Delta_{ave}$ of 1.5%. They are nearly less than half the value of $|B_0|=1.1 \times 10^{-4}$ in the conventional structure. The reason for this is assumed that the graded-index structure enhances the electric field distribution around the center of the third core layer, and that the birefringence near the center of the core is reduced because of remarkable stress distribution in the core due to the graded-index structure. When stacking the core layers with different refractive indices alternately, the light perceives the average value of the birefringence distribution due to the stress, and its magnitude is about the same as the waveguide birefringence of the conventional optical waveguides structure. Accordingly, the correction by only the correction coefficient $c_1$ can establish equation (1) as in the foregoing embodiments.

The birefringence occurring other than the magnitude $|B_s|$ of the geometrical birefringence obtained by the mode solver is $7 \times 10^{-5}$ for the average relative refractive index difference $\Delta_{ave}$ of 0.75%, and $4 \times 10^{-5}$ for the average relative refractive index difference $\Delta_{ave}$ of 1.5% according to the magnitude $|B_0|$ of the waveguide birefringence of the conventional core structure, the magnitude $|B_s|$ of the geometrical birefringence obtained by the mode solver, and the birefringence $|B_e|$ estimated from the transmission spectra of the arrayed waveguide grating fabricated. When adjusting in the neighborhood of the foregoing setting for further improvement, the correction coefficients $c_1$ and $c_2$ of equations (1)–(3) should be placed at $c_1$=1.15 and $c_2$=$7 \times 10^{-5}$, or $c_1$=2.52 and $c_2$=$4 \times 10^{-5}$.

[Embodiment 8]

Figure 19:
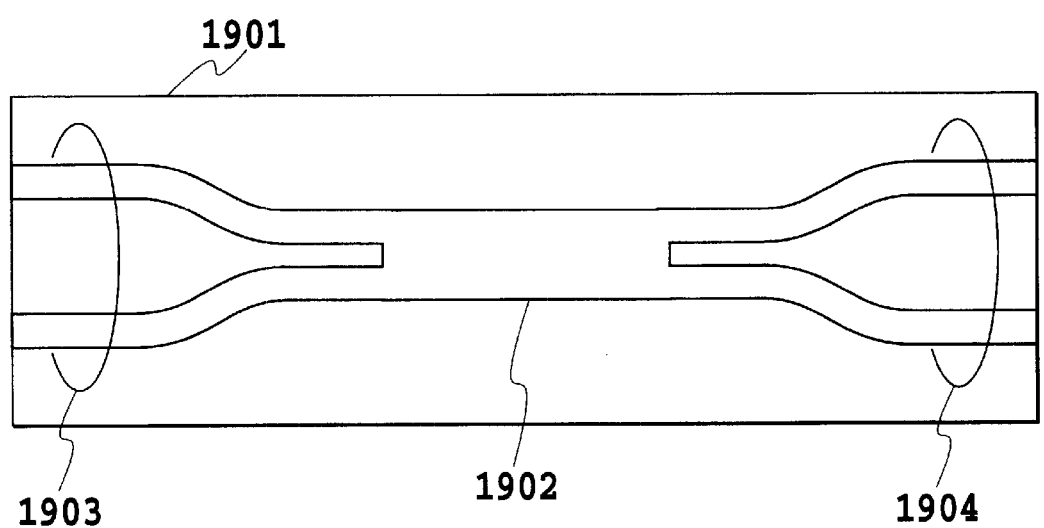
FIG. 19 is a diagram showing a configuration of an MMI of the eighth embodiment in accordance with the present invention.

The eighth embodiment in accordance with the present invention is an optical waveguide circuit that applies the multilayer structure, which is composed of two types of layers with different relative refractive index differences stacked alternately as shown in FIG. 7, to a multi-mode waveguide 1902, an optical interference section of an MMI 1901 which is an optical coupler as shown in FIG. 19. Although the coupling ratio of the MMI 1901 is less affected by fabrication error than that of a directional coupler, the MMI has a greater excess loss. In addition, when it has waveguide birefringence, the excess loss has polarization dependence.

In the present embodiment, the average relative refractive index difference $\Delta_{ave}$ of the core was set 0.75%, the core height was set 6 μm, the core width of a multi-mode waveguide 1902 was set 24 μm, and the core width of input and output waveguides 1903 and 1904 was set 6 μm. The relative refractive index differences $\Delta_i$, layer thicknesses $t_i$ and the numbers of layers $N_i$ of the individual layers were set as follows by the mode solver so that the magnitude $|B_s|$ of the birefringence due to the multilayer structure became $5\times10^{-4}$. The value of $|B_s|$ was estimated by BPM (beam propagation method) from the polarization dependence of the excess loss of the MMI 1901 with the conventional waveguide structure. In addition, the correction coefficients of equation (1) were estimated as $c_1=0.97$ and $c_2=0$ from the result of the mode solver. The length of the multi-mode waveguide 1902 in the traveling direction of light was set 1.4 mm and 1.45 mm, thereby providing two types of MMIs.

first core layers 703a, $\Delta_1=3.1\%$, $t_1=0.28$ μm, $N_1=5$ second core layers 703b, $\Delta_2=0\%$, $t_2=1.15$ μm, $N_2=4$ The fabricating process was the same as that of the first embodiment.

Although the excess loss differences (at wavelength 1.55 μm) due to the polarization of the MMI 1901 at the lengths of 1.4 mm and 1.45 mm of the multi-mode waveguide 1902 in the traveling direction of light were 0.1 dB and 0.4 dB in the conventional core structure, those of the present embodiment were both reduced to 0.02 dB thanks to the multilayer structure. Thus, it was confirmed that the multilayer structure of the multi-mode waveguide core could reduce polarization dependence of the optical waveguide circuit.

To fabricate the Mach-Zehnder interferometer 101 as shown in FIG. 1A using the MMI 1901 instead of the directional coupler 102, since the optical waveguides 103 and MMI 1901 have different birefringence, it is preferable that the optical waveguides 103 utilize the multilayer structure of the first embodiment, and the MMI 1901 employs the multilayer structure of the present embodiment. As for the fabrication process, the multi-mode waveguide core is fabricated first according to the process of the present embodiment, followed by the fabrication of the single-mode waveguides according to the first embodiment. When forming the core layers of the single-mode waveguide, they are also formed on the multi-mode waveguide core. However, they can be removed afterward at the same time when forming the core ridge by processing the core layer. The characteristics of the Mach-Zehnder interferometer thus fabricated were obtained from the transmission spectra: the wavelength shift was 0.01 nm, and the loss difference between the TE mode and TM mode at the peak wavelengths was less than 0.03 dB. Thus, it was confirmed that the polarization dependence of the optical waveguide circuit could be eliminated by forming appropriate multilayer structures in the optical waveguides with the different birefringence.

Although the present embodiment implements the single-mode waveguides and the multi-mode waveguide with different multilayer structures, this is not essential. For example, it is possible to fabricate both the waveguide cores with the multilayer structure of the multi-mode waveguide, and to insert a λ/2 waveplate into the optical waveguides 103. With this configuration, the wavelength shift was reduced to 0.005 nm, and the loss difference between the TE mode and TM mode at the peak wavelengths was less than 0.03 dB.

In addition to the foregoing embodiments, it is possible for the present invention to adjust the average relative refractive index difference, dimension, and the birefringence value due to the multilayer structure of the core by the relative refractive index differences, thicknesses and the numbers of layers of the individual layers. Thus, the present invention is not limited to the average relative refractive index difference, dimension and the birefringence value due to the multilayer structure of the core, or to the refractive indices, thicknesses and the numbers of layers of the individual layers of the core portions of the foregoing embodiments.

The single-mode waveguide in accordance with the present invention includes a pseudo-single-mode waveguide that consists of a waveguide with two modes or so, and functions almost like a single-mode waveguide in a circuit.

In addition, although the foregoing embodiments employ the Mach-Zehnder interferometer, arrayed waveguide grating, and optical waveguide circuit using a single MMI, this is not essential. For example, the embodiments are applicable to any optical circuits such as a ring oscillator that can be configured using the optical waveguides.

In addition, although the foregoing embodiments set the geometrical birefringence value $|B_s|$ due to the multilayer structure at a value nearly equal to the magnitude $|B_0|$ of the waveguide birefringence in the core structure, the birefringence can be reduced as compared with that of the conventional device as long as the geometrical birefringence value $|B_s|$ is less than twice the $|B_0|$. In addition, the Mach-Zehnder interferometer and arrayed waveguide grating of the foregoing embodiments can limit the loss fluctuations due to polarization within about 0.1 dB by reducing the birefringence to less than about $5\times10^{-5}$.

Although it is described in the second and third embodiments that the connection loss with the optical fiber is less than that of the conventional examples, the connection loss with the optical fiber is also reduced in the other embodiments when the number of layers is small. The excess losses of the optical circuits fabricated do not increase as compared with the conventional examples, and selecting the number of layers appropriately makes it possible to bring the spot size of light traveling the input/output waveguides to that of the optical fiber without impairing the circuit characteristics, thereby reducing the connection loss with the optical fiber.

Although the cladding and core are formed by the flame hydrolysis deposition in the foregoing embodiments, other fabrication methods that can form the multilayer structure composed of silica glass are also applicable. For example, they can be formed by ECR-CVD (Electron Cyclotron Resonance-Chemical Vapor Deposition), sputtering method or plasma CVD, resulting in the reduction or elimination of the waveguide birefringence. In addition, although $GeO_2$ is used to adjust the refractive indices, other dopants such as $TiO_2$ are applicable as long as they can set the refractive indices at desired values. In addition, although they employ silica-based glass as a material of the waveguides, other materials such as glass family materials and polymer materials are also applicable as long as they can form multilayer structure composed of layers with different refractive indices.

Although the foregoing embodiments reduce the waveguide birefringence occurring in the conventional structures by means of the multilayer structure only, they can also be combined with the conventional reduction methods of the birefringence of the waveguide described in the conventional techniques, which adjust the dopant material and doping amount of the claddings covering the cores.

The following embodiments 9–16 mainly handle the multilayer structure core for reducing the waveguide birefringence of the slab waveguide.

[Embodiment 9]

Figure 20A:
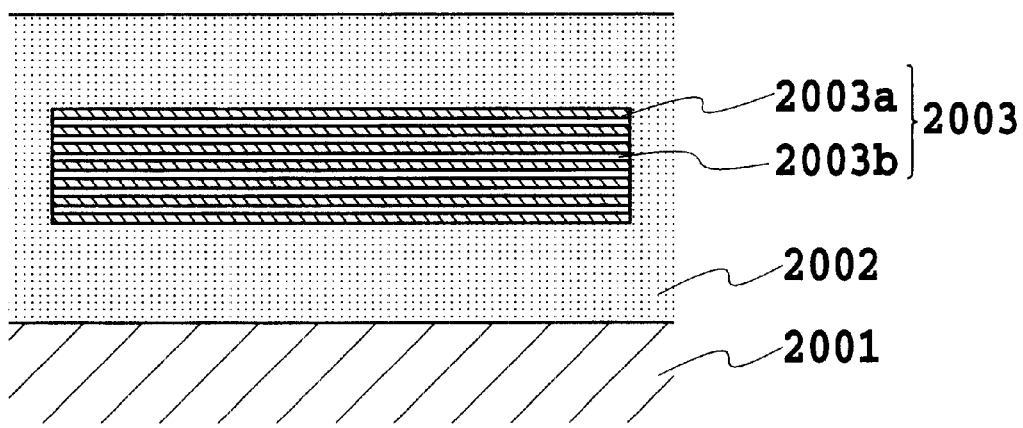
FIGS. 20A and 20B are cross-sectional views showing a ninth, tenth and twelfth embodiments of the optical waveguide circuit in accordance with the present invention.
Figure 20B:
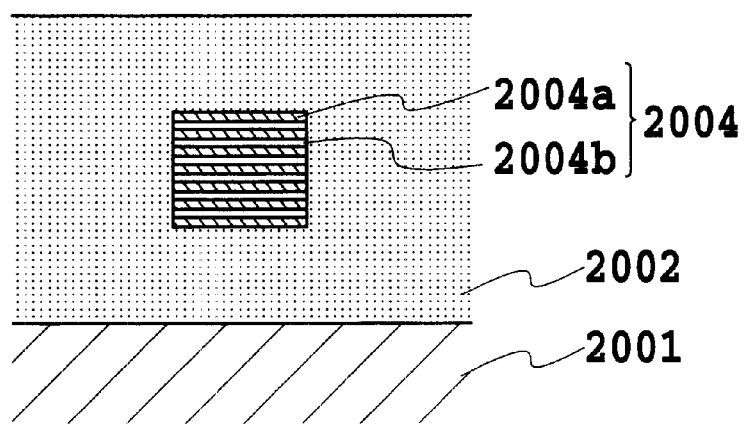

FIGS. 20A and 20B are cross-sectional views showing the ninth embodiment of the optical waveguide circuit in accordance with the present invention: FIG. 20A is a cross-sectional view of a slab waveguide; and FIG. 20B is a cross-sectional view of a single-mode waveguide. A substrate 2001 consists of a silicon substrate, and a cladding 2002 and cores 2003 and 2004 are composed of silica-based glass. The core (slab waveguide) 2003 has a multilayer structure composed of first core layers 2003a and second core layers 2003b which are parallel to the surface of the substrate, and are stacked in the direction perpendicular to the substrate. Likewise, the core 2004 (single-mode waveguide) has a multilayer structure composed of first core layers 2004a and second core layers 2004b which are parallel to the surface of the substrate, and are stacked in the direction perpendicular to the substrate.

The relative refractive index differences, layer thicknesses, and the numbers of layers of the first core layers 2003a and 2004a and second core layers 2003b and 2004b were obtained by the mode solver of the waveguides such that the average relative refractive index difference of the cores 2003 and 2004 was set 0.75%, their core thickness was set 6 µm (the waveguide width of the core 2004 was 6 µm), the geometrical birefringence B due to the multilayer structure value was set $-9 \times 10^{-4}$ ($-7 \times 10^{-4}$ on a single-mode waveguide basis). Here, the average relative refractive index difference is the areal average of the relative refractive index differences of the individual core layers, which is given by equations (2) and (3).

The relative refractive index difference $\Delta_i$, layer thickness $t_i$, and the number of layers $N_i$ ($i=_1$ and $_2$) of each layer used in the present embodiment are:

first core layers 2003a and 2004a:
$\Delta_1=4.4\%$, $t_1=0.15$ µm, $N_1=7$.
second core layers 2003b and 2004b:
$\Delta_2=0\%$, $t_2=0.83$ µm, $N_2=6$.

The slab waveguide of the present embodiment was fabricated as follows. On a substrate 2001 composed of a silicon substrate, a silica-based under-cladding layer (cladding under the core) and a core layer were formed by the flame hydrolysis deposition. The core layer was composed of the first core layers and second core layers stacked alternately. The first core layers were doped with $GeO_2$ of 44 mol % to increase the refractive indices, and with trace amounts of $B_2O_3$ and $P_2O_5$ to reduce the consolidation temperature. Subsequently, unnecessary portions of the core layers were removed by the reactive ion etching, thereby forming the core ridges 2003 and 2004. After that, over-claddings with the same refractive indices as that of the under-claddings were formed such that they cover the cores 2003 and 2004 by the flame hydrolysis deposition. The cladding 2002 consists of the under-cladding and the over-cladding.

Using slab waveguides and single-mode waveguides with the multilayer structure, the arrayed waveguide grating 111 as shown in FIG. 1B was fabricated. Specifically, the slab waveguides 112 were formed using the slab waveguide with the foregoing multilayer structure, and the waveguide array 113, input waveguide 114 and output waveguide 115 were formed using the single-mode waveguide with the foregoing multilayer structure.

Figure 21:
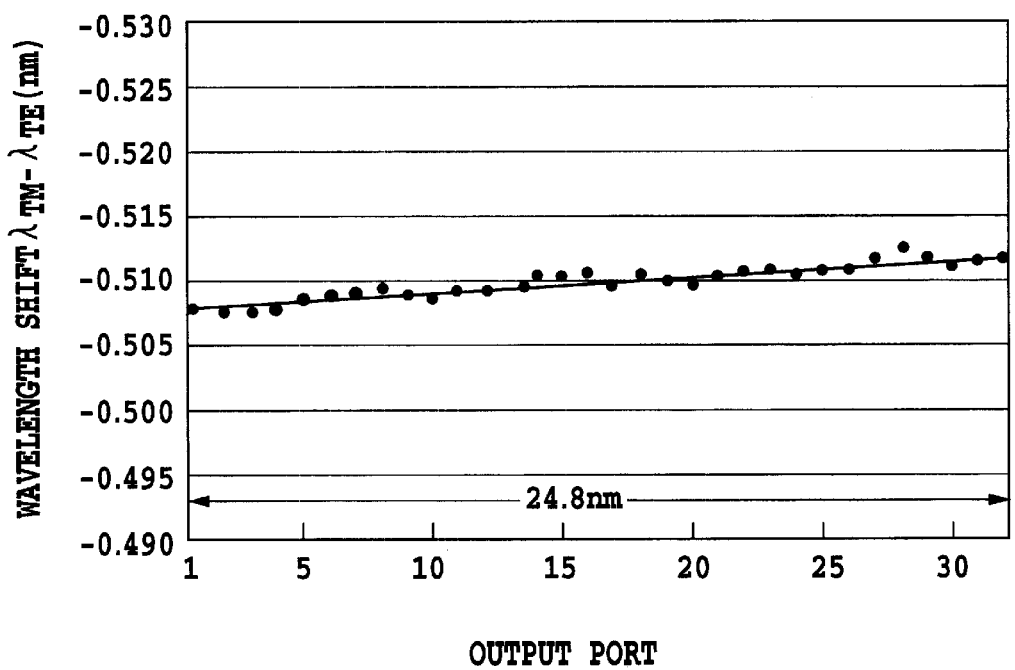
FIG. 21 is a graph illustrating the wavelength shift at the output ports of the arrayed waveguide grating of the ninth embodiment.

FIG. 21 illustrates the wavelength shift of the TM mode with respect to the TE mode of the individual output ports of the arrayed waveguide grating 111 fabricated. Because of the waveguide array 113 with the multilayer structure, the wavelength shift becomes about −0.51 nm, but the variations between the output ports are reduced to about 0.004 nm, ⅕ of 0.02 nm of the conventional examples. Thus, it is confirmed that the waveguide birefringence of the slab waveguide is reduced.

The arrayed waveguide grating 111 was provided with a half waveplate such that it crossed the waveguide array 113 perpendicularly. The wavelength shift at the individual output ports was within ±0.003 nm (the variations between the output ports was about 0.004 nm), which means that the reduction limit of the polarization dependence can be reduced from ±0.01 nm of the conventional examples.

[Embodiment 10]

The 10th embodiment in accordance with the present invention increases the relative refractive index difference Δ of the core of the ninth embodiment from 0.75% to 1.5%. Increasing the relative refractive index difference makes it possible to reduce the radius of curvature of the single-mode waveguide, thereby offering an advantage of being able to reduce the size of the optical circuit. However, since the connection loss with an ordinary optical fiber increases, it is necessary to apply a spot size conversion technique at the input and output waveguide sections.

The relative refractive index differences, layer thicknesses, and the numbers of layers of the first core layers 2003a and 2004a and second core layers 2003b and 2004b were obtained by the mode solver of the waveguides such that the average relative refractive index difference of the cores 2003 and 2004 became 1.5%, the core thickness became 4 µm (where the waveguide width of the core 2004 was 4 µm), the geometrical birefringence B due to the multilayer structure value became $-5 \times 10^{-4}$. The geometrical birefringence B was made smaller than that of the ninth embodiment because the birefringence value of the slab waveguide with the conventional structure increased with an increase in the relative refractive index difference Δ.

The relative refractive index differences $\Delta_i$, layer thicknesses $t_i$, and the numbers of layers $N_i$ (where i=1 and 2) of the individual layers used in the present embodiment were as follows:

first core layers 2003a and 2004a:
$\Delta_1=2.7\%$, $t_1=0.58$ µm, $N_1=4$
second core layers 2003b and 2004b:
$\Delta_2=0\%$, $t_2=0.57$ µm, $N_2=3$.

The slab waveguide of the present embodiment was fabricated in the same fashion as that of the ninth embodiment, and the first core was doped with $GeO_2$ of 27 mol % to increase the refractive index.

Using the slab waveguides and single-mode waveguides with the multilayer structure, the arrayed waveguide grating 111 with the circuit configuration as shown in FIG. 1B was fabricated as in the ninth embodiment. After that, a half waveplate was inserted into the arrayed waveguide grating 111 such that it crossed the waveguide array 113 perpendicularly. The wavelength shift amount of the TM mode with respect to the TE mode at the individual output ports was within ±0.005 nm (the variations between the output ports was 0.005 nm). Thus, it was confirmed that the present embodiment can reduce the wavelength shift amount from that of the conventional examples as in the ninth embodiment.

[Embodiment 11]

Figure 22A:
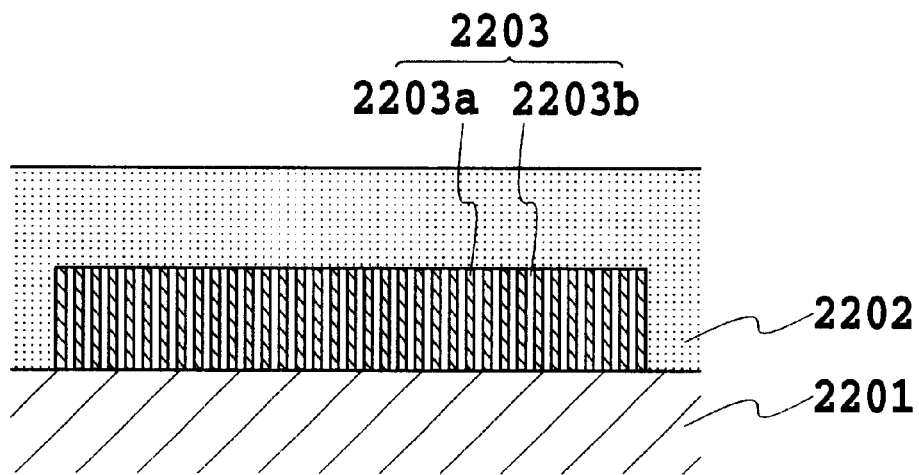
FIGS. 22A and 22B are cross-sectional views showing an 11th embodiment of the optical waveguide circuit in accordance with the present invention.
Figure 22B:
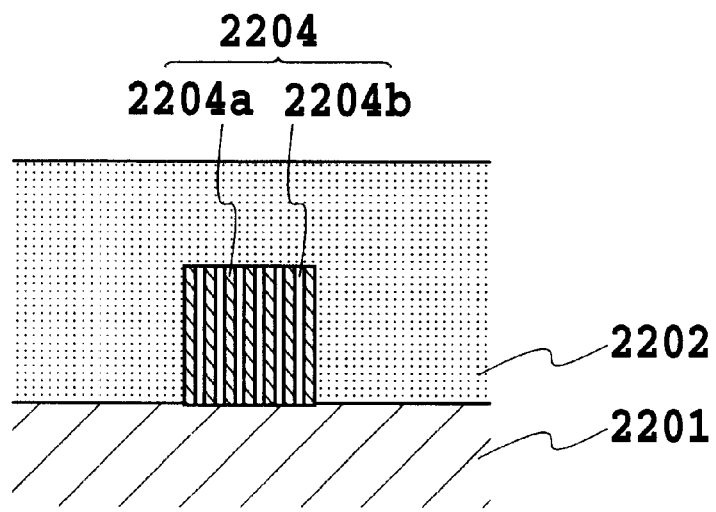

FIGS. 22A and 22B are cross-sectional views showing an 11th embodiment of the slab waveguide in accordance with the present invention: FIG. 22A is a cross-sectional view of a slab waveguide; and FIG. 22B is a cross-sectional view of a single-mode waveguide. A substrate 2201 is a silica substrate, and a cladding 2202 and cores 2203 and 2204 are composed of silica glass. The core (slab waveguide) 2203 has a multilayer structure composed of first core layers 2203a and second core layers 2203b formed in the direction perpendicular to the substrate (usually, several hundred layers to several thousand layers). Likewise the core (single-mode waveguide) 2204 has a multilayer structure composed of first core layers 2204a and second core layers 2204b formed in the direction perpendicular to the substrate (usually, several layers to dozens of layers).

The refractive indices and layer thicknesses of the first core layers 2203a and 2204a and second core layers 2203b and 2204b were obtained by the mode solver of the waveguide such that the average relative refractive index difference of the cores 2203 and 2204 became 0.75%, their core thickness became 6 μm (where, the waveguide width of the core 2204 was 6 μm), and the geometrical birefringence value B due to the multilayer structure was made $-9 \times 10^{-4}$ ($-7 \times 10^{-4}$ in a single-mode waveguide basis).

The relative refractive index differences $\Delta_i$ and layer thicknesses $t_i$ (where i=1 and 2) of the individual layers employed in the present embodiment were as follows:
first core layers 2203a and 2204a: $\Delta_1$=4.9%, $t_1$=0.23 μm
second core layers 2203b and 2204b: $\Delta_2$=0%, $t_2$=1.69 μm.

The slab waveguide of the present embodiment was fabricated as follows. On the substrate 2201 composed of a silica substrate, the core layers corresponding to the first core layers 2203a and 2204a were formed by the flame hydrolysis deposition. The first core layers 2203a and 2204a were doped with $GeO_2$ of 49 mol % to increase the refractive indices. After removing the portions corresponding to the second core layers by the reactive ion etching, the claddings were formed such that they cover the strip-like first core layers 2203a and 2204a by the flame hydrolysis deposition. The second core layers 2203b and 2204b were formed simultaneously with the claddings 2202.

In this case, interfaces of the first core layers and second core layers constituting the cores were made approximately parallel with a line segment connecting the centers of the input and output ends in the case of the slab waveguide. On the other hand, as for the single-mode waveguide, they were provided in the direction approximately parallel to the direction of the traveling light, that is, in the direction along the waveguide.

Using the slab waveguides and single-mode waveguides with the multilayer structure, the arrayed waveguide grating 111 as shown in FIG. 1B was fabricated. Specifically, the slab waveguides 112 were fabricated using the slab waveguide with the foregoing multilayer structure, and the waveguide array 113, input waveguide 114, output waveguide 115 were fabricated using the single-mode waveguide with the foregoing multilayer structure. After that, a half waveplate was inserted into the waveguide array 113 such that it crossed the array perpendicularly.

The wavelength shift of the TM mode with respect to the TE mode at the individual output ports was within ±0.006 nm (the variations between the output ports were about 0.005 nm). Thus, the reduction limit of the polarization dependence can be reduced from the conventional value of ±0.01 nm.

Incidentally, although the cores 2203 and 2204 are formed directly on the substrate 2201 in the present embodiment, they can be formed on the under-claddings as in the ninth and 10th embodiments.

[Embodiment 12]

The 12th embodiment in accordance with the present invention is characterized in that the multilayer structure of the core of the waveguide array 113 of the arrayed waveguide grating 111 as shown in FIG. 1B described in the ninth embodiment has a multilayer structure with geometrical birefringence smaller than that of the slab waveguides 112.

The relative refractive index differences $\Delta_i$, layer thicknesses $t_i$ and the numbers of layers $N_i$ (where i=1 and 2) of the first core layers and second core layers were determined as follows so that the geometrical birefringence value B of the multilayer structure of the core of the waveguide array 113 became $-2.3 \times 10^{-4}$.

first core layers: $\Delta_1$=2%, $t_1$=0.45 μm, $N_1$=5
second core layers: $\Delta_2$=0%, $t_2$=0.94 μm, $N_2$=4.

The arrayed waveguide grating 111 of the present embodiment is fabricated as follows. The under-cladding was formed on the silicon substrate by the flame hydrolysis deposition, on which the core layers for the waveguide array were formed with the foregoing parameters by the flame hydrolysis deposition. The first core layers were doped with $GeO_2$ of 20 mol % and with trace amounts of $B_2O_3$ and $P_2O_5$. The core layers of the waveguide array corresponding to the portions at which the slab waveguides 112 were to be formed were removed by the reactive ion etching, followed by forming the core layers for the slab waveguides 112 with the same parameters as in the ninth embodiment by the flame hydrolysis deposition. Then, the core layers for the slab waveguides 112 formed on the core layers of the waveguide array were removed by the reactive ion etching. Thus, on the under-cladding were formed the core layers with the multilayer structures suitable for slab waveguide forming sections and single-mode waveguide forming sections.

Next, the unnecessary portions of the core layers were removed by the reactive ion etching to form the core ridges. After that, the over-claddings with the same refractive index as that of the under-cladding were formed by the flame hydrolysis deposition in such a manner that the over-claddings covered the core.

The wavelength shift amounts of the TM mode with respect to the TM mode of the individual output ports of the arrayed waveguide grating 111 fabricated were less than 0.02 nm (the variations between the output ports were 0.004 nm). Although its polarization dependence was slightly greater than that of the method using the half waveplate to reduce the polarization dependence, it can achieve small enough wavelength shift and variations between the output ports as compared with the wavelength shift of 0.2–0.3 nm (the variations between the output ports were 0.02 nm) obtained before applying the method of reducing the polarization dependence.

[Embodiment 13]

The 13th embodiment in accordance with the present invention determines the multilayer structure of the slab waveguides of the ninth and 12th embodiments more precisely by equations (1)–(3), thereby reducing the variations in the wavelength shift of the arrayed waveguide grating.

The relative refractive index differences $\Delta_i$ and layer thicknesses $t_i$ (i=1 and 2) of the first core layers 2003a and second core layers 2003b of the slab waveguide as shown in FIG. 20A were set by the following procedures.

Procedure 1) An optical circuit was fabricated using an appropriate multilayer structure. Then, from its characteristics, the geometrical birefringence value due to the multilayer structure was estimated. The correction coefficients $c_1$ and $c_2$ were determined from the estimation results and equations (1)–(3).

Procedure 2) The relative refractive index differences $\Delta_i$ and layer thicknesses $t_i$ (i=1 and 2) were determined from equations (1)–(3) such that the geometrical birefringence due to the multilayer structure became a predetermined value. As for the procedure 1), the mode solver can be used instead of fabricating the optical circuit as long as the multilayer structure has high fabricated accuracy, and no new birefringence such as stress-induced birefringence is added except for the geometrical birefringence due to the multilayer structure composed of stacked layers with different refractive indices.

To determine the multilayer structure under the conditions that the average relative refractive index difference $\Delta_{ave}$ of the core is 0.75%, and the core thickness is 6 μm, the arrayed waveguide grating as shown in FIG. 1B was fabricated in the procedure 1) in the form of three types, in which the relative refractive index differences $\Delta_i$ and layer thicknesses $t_i$ (i=1 and 2) of the first core layers 2003a and second core layers 2003b were determined as follows. As for the number of layers, the total number of the layers was made 13, the number of first core layers $N_1$ was made seven, and the number of second core layers $N_2$ was made six.

1) first core layers 2003a, $\Delta_1$=1.0%, $t_1$=0.64 μm
   second core layers 2003b, $\Delta_2$=0%, $t_2$=0.25 μm
2) first core layers 2003a, $\Delta_1$=3.0%, $t_1$=0.2 μm
   second core layers 2003b, $\Delta_2$=0%, $t_2$=0.76 μm
3) first core layers 2003a, $\Delta_1$=5.1%, $t_1$=0.12 μm
   second core layers 2003b, $\Delta_2$=0%, $t_2$=0.86 μm The slab waveguides and single-mode waveguides were formed in the same manner as those of the ninth embodiment, and the arrayed waveguide grating was fabricated. To increase the refractive indices, $GeO_2$ was doped by an amount of 10 mol % per relative refractive index difference.

Figure 23:
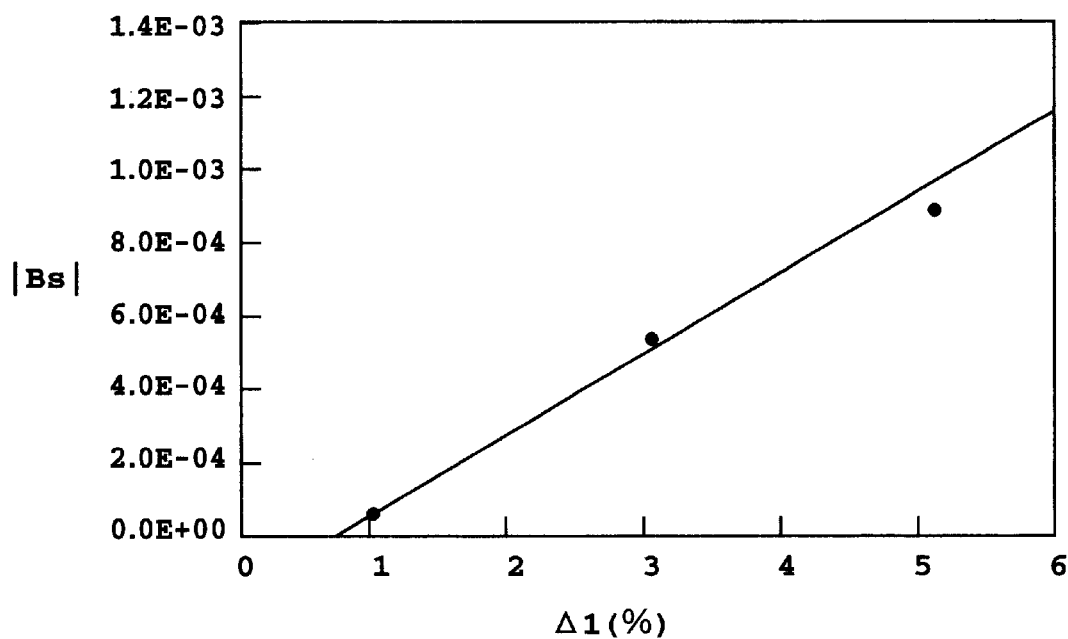
FIG. 23 is a graph illustrating the magnitude $|B_s|$ of the birefringence due to the multilayer structure against the relative refractive index difference $\Delta_1$ of the first core of the multilayer structure core for illustrating a 13th embodiment in accordance with the present invention.

To estimate the value $B_s$ of the waveguide birefringence due to the multilayer structure, the variations in the wavelength shift of the TM mode with respect to the TE mode were measured at the individual output ports of the fabricated arrayed waveguide grating. The birefringence value $B_e$ in the slab waveguides was estimated from the variations, and the value $B_s$ of the waveguide birefringence due to the multilayer structure was estimated by subtracting from the $B_e$ the waveguide birefringence value $B_0$=1.1×10$^{-3}$ of the conventional core structure. Here, the value $B_0$=1.1×10$^{-3}$ was a value reestimated from the wavelength shift of the ninth embodiment. Closed circles of FIG. 23 represent the magnitude $|B_s|$ of the birefringence due to the multilayer structure plotted against the relative refractive index difference of the first core layers. The correction coefficients $c_1$ was set at one and $c_2$ at zero from the estimation result and equations (1)–(3). The solid line was calculated from the correction coefficients and equations (1)–(3).

Next, in the procedure 2), the relative refractive index differences $\Delta_i$ and layer thicknesses $t_i$ (i=1 and 2) of the first core layers 2003a and the second core layers 2003b at which $|B_s|=|B_0|$=1.1×10$^{-3}$ held were obtained from equations (1)–(3) in which correction coefficients $c_1$ was placed at one and $c_2$ at zero. From the solid line of FIG. 23 obtained as the result of the calculation, it is seen that the relative refractive index difference $\Delta_1$ of the first core layers 2003a at which $|B_s|=|B_0|$=1.1×10$^{-3}$ holds is 5.5%, and the values $t_1$ and $t_2$ become as follows from equations (2) and (3).

first core layers 2003a, $\Delta_1$=5.5%, $t_1$=0.11 μm, $N_1$=7
second core layers 2003b, $\Delta_2$=0%, $t_2$=0.87 μm, $N_2$=6

Since the value $|B_s|$ varies as an approximate linear function of the value $\Delta_1$ as illustrated in FIG. 23, the value $\Delta_1$ for the predetermined value $|B_s|$ can be determined by obtaining the value $|B_s|$ for a few points $\Delta_1$, and by estimating an approximate line as a linear function of the value $\Delta_1$.

The arrayed waveguide grating as shown in FIG. 1B was fabricated using the slab waveguides with the multilayer structure. After that, a half waveplate was inserted into the arrayed waveguide grating 111 such that it crossed the waveguide array 113 perpendicularly. The wavelength shift amounts of the TM mode with respect to the TE mode at the individual output ports were within ±0.002 nm (the variations between the output ports were 0.002 nm).

As in the 12th embodiment, the multilayer structure that would place the geometrical birefringence value of the waveguide array 113 at −2.3×10$^{-4}$ was fabricated in the conditions that the relative refractive index differences $\Delta_i$, layer thicknesses $t_i$ and the numbers of layers $N_i$ (i=1 and 2) of the first core layers and second core layers were first core $\Delta_1$=2%, $t_1$=0.45 μm, $N_1$=5
second core $\Delta_2$=0%, $t_2$=0.94 μm, $N_2$=4.

The wavelength shift amounts of the TM mode with respect to the TE mode at the individual output ports were within ±0.008 nm (the variations between the output ports were 0.002 nm).

The polarization dependence of the arrayed waveguide grating can be reduced by determining the multilayer structure of the slab waveguides of the ninth and 12th embodiments more precisely by equations (1)–(3).

[Embodiment 14]

The 14th embodiment in accordance with the present invention is configured such that it varies the number of layers of the core in the 13th embodiment in a range of about ⅓2.

As in the 13th embodiment, the multilayer structure of the slab waveguide core 2003 as shown in FIG. 20A has the average relative refractive index difference $\Delta_{ave}$ of 0.75%, the core thickness of 6 μm, the relative refractive index differences $\Delta_1$ of the first core layers 2003a of 5.5%, and the relative refractive index differences $\Delta_2$ of the second core layers 2003b of 0% (the magnitude $|B_s|$ of the birefringence due to the multilayer structure is 1.1×10$^{-3}$). Ten types of the arrayed waveguide gratings as shown in FIG. 1B were fabricated with varying the number of layers $N_1$ of the first core layers in a range of 2–11. The number of layers $N_2$ of the second core was $(N_1-1)$. The layer thickness $t_1$ of the first core layers 2003a and the layer thickness $t_2$ of the second core layers 2003b were determined as follows:.

1) $N_1$=2, $t_1$=0.39 μm, $t_2$=5.22 μm
2) $N_1$=3, $t_1$=0.26 μm, $t_2$=2.61 μm
3) $N_1$=4, $t_1$=0.20 μm, $t_2$=1.74 μm
4) $N_1$=5, $t_1$=0.16 μm, $t_2$=1.31 μm
5) $N_1$=6, $t_1$=0.13 μm, $t_2$=1.04 μm
6) $N_1$=7, $t_1$=0.11 μm, $t_2$=0.87 μm
7) $N_1$=8, $t_1$=0.10 μm, $t_2$=0.75 μm
8) $N_1$=9, $t_1$=0.09 μm, $t_2$=0.65 μm
9) $N_1$=10, $t_1$=0.08 μm, $t_2$=0.58 μm
10) $N_1$=11, $t_1$=0.07 μm, $t_2$=0.52 μm.

The fabricating process of the waveguide was the same as that of the ninth embodiment.

The variations in the wavelength shift of the TM mode with respect to the TE mode between the individual output ports were 0.005 nm when $N_1$ was two, and the value $|B_s|$ was greater than the predetermined value by an amount of 2.5×10$^{-4}$. This is because the waveform distortion is greater in the present embodiment than in the distribution of the electromagnetic field of the conventional structure. The variations between the ports were 0.003 nm when the total number of the layers was five or more, which indicated that the value $|B_s|$ was set within 1.5×10$^{-4}$ from the predetermined $|B_s|$. Accordingly, it is preferable that the total number of the layers be set at five or more.

[Embodiment 15]

The 15th embodiment in accordance with the present invention relates to an optical waveguide circuit composed of three types of optical waveguides with different widths: the single-mode waveguide, multi-mode waveguide, and slab waveguide, all of which employs the multilayer structure, the geometrical birefringence of which increases in the order of the single-mode waveguide, multi-mode waveguide, and slab waveguide. The optical waveguide circuit is composed of the arrayed waveguide grating 111 as shown in FIG. 1B, and the Mach-Zehnder interferometer 101 as shown in FIG. 1A. As for the optical coupler, the present embodiment utilizes the MMI 1901 as shown in FIG. 19 instead of the directional couplers 102.

FIG. 1A is a diagram showing the Mach-Zehnder interferometer 101. It is composed of MMIs 1901 in place of the directional couplers 102, the optical couplers; the optical waveguides 103 interconnecting the two MMIs; the input waveguide 104 connected to one of the MMIs; and the output waveguide 105 connected to the other MMI. FIG. 19 is a diagram showing a configuration of the MMI 1901. It is composed of the multi-mode waveguide 1902, the input waveguides 1903 connected to its one end, and the output waveguides 1904 connected to its the other end.

The average relative refractive index difference $\Delta_{ave}$ of the core was set 0.75%, the height of the core 6 μm, the core width of the single-mode waveguide 6 μm, the core width of the multi-mode waveguide 24 μm, and the width of the slab waveguide 2 mm. The relative refractive index differences $\Delta_i$, layer thicknesses $t_i$, the numbers of layers $N_i$ of the individual layers of the multilayer structure were set at the following values by equations (1)–(3) so that the magnitude $|B_s|$ of the birefringence due to the multilayer structure became $2.3 \times 10^{-4}$ in the single-mode waveguide, $5 \times 10^{-4}$ in the multi-mode waveguide, and $1.1 \times 10^{-3}$ in the slab waveguide. The correction coefficients were set at $c_1=0.8$ and $c_2=0$ in the single-mode waveguide, $c_1=0.97$ and $c_2=0$ in the multi-mode waveguide and $c_1=1$ and $c_2=0$ in the slab waveguide.

single-mode waveguide:
    first core $\Delta_1=2\%$, $t_1=0.45$ μm, $N_1=5$
    second core $\Delta_2=0\%$, $t_2=0.94$ μm, $N_2=4$
multi-mode waveguide:
    first core $\Delta_1=3.1\%$, $t_1=0.28$ μm, $N_1=5$
    second core $\Delta_2=0\%$, $t_2=1.15$ μm, $N_2=4$
slab waveguide:
    first core $\Delta_1=5.5\%$, $t_1=0.16$ μm, $N_1=5$
    second core $\Delta_2=0\%$, $t_2=1.31$ μm, $N_2=4$ The optical waveguide circuit was fabricated in the same process as the 12th embodiment, and the cores were formed for the slab waveguides, multi-mode waveguides, and single-mode waveguides in this order.

As for the characteristics of the Mach-Zehnder interferometer of the optical waveguide circuit fabricated, the wavelength shift was reduced to 0.01 nm from the conventional value of 0.25 nm, and the loss difference between the peak wavelengths of the TE mode and TM mode was reduced to 0.03 dB from the conventional value of 0.2 dB. As for the characteristics of the arrayed waveguide grating, the wavelength shift amount of the TM mode with respect to the TE mode at the individual output ports was reduced from the conventional value of within ±0.13 nm (variations between the output ports were 0.02 nm) to within ±0.01 nm (the variations between the output ports were 0.002 nm). Thus, it was confirmed that applying appropriate multilayer structures to the optical waveguide circuit composed of the single-mode waveguides, multi-mode waveguides and slab waveguides could reduce the polarization dependence.

[Embodiment 16]

The 16th embodiment in accordance with the present invention has a multilayer core structure composed of three types of layers with different relative refractive index differences that are stacked almost alternately.

Figure 24:
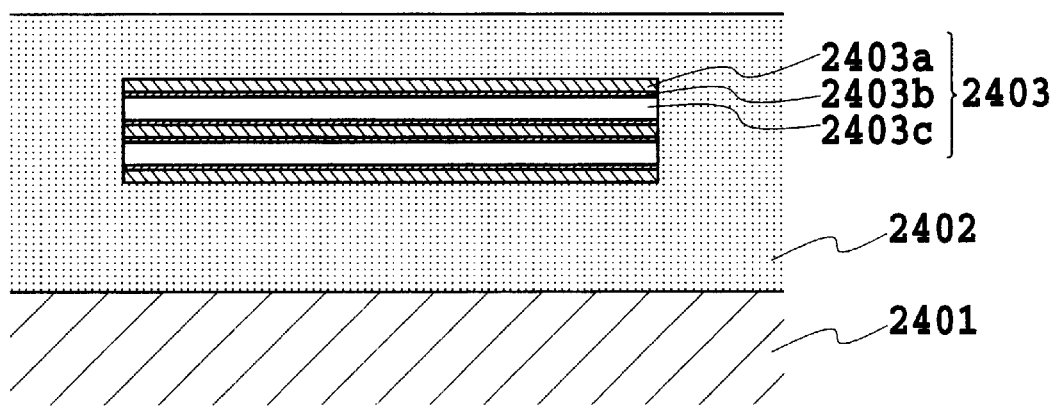
FIG. 24 is a cross-sectional view showing a 16th embodiment in accordance with the present invention.

FIG. 24 is a cross-sectional view showing a slab waveguide of the present embodiment in accordance with the present invention. It employs a silicon substrate as a substrate 2401, and a cladding 2402 and a core 2403 are composed of silica-based glass. The core 2403 is composed of first core layers 2403*a*, second core layers 2403*b*, and third core layers 2403*c*, which are stacked from the substrate side in the order of the first core layers 2403*a*, second core layers 2403*b*, third core layer 2403*c*, second core layers 2403*b* with half the film thickness, first core layers 2403*a*, second core layers 2403*b* with half the film thickness, third core layer 2403*c*, second core layers 2403*b*, and first core layers 2403*a*. Thus, the individual layers are stacked symmetrically with respect to the center layer of the core.

The average relative refractive index difference $\Delta_{ave}$ of the core was set 0.75%, the core thickness was set 6 μm, the relative refractive index difference $\Delta_1$ of the first core layers 2403*a* was set 6%, the relative refractive index difference $\Delta_2$ of the second core layers 2403*b* was set 5%, and the relative refractive index difference $\Delta_3$ of the third core layers 2403*c* was set 0%. Then, the thicknesses of the individual layers that would place the geometrical birefringence $|B_s|$ due to the multilayer structure at $1.1 \times 10^{-3}$ were determined as follows by equations (1)–(3) in which the correction coefficients were set at $c_1=1$ and $c_2=0$ that were obtained in the embodiment 13. Thus, the arrayed waveguide grating as shown in FIG. 1B was fabricated. The fabricating process was the same as that of the ninth embodiment.

first core layers 2403*a*, $\Delta_1=6\%$, $t_1=0.12$ μm, $N_1=3$
    second core layers 2403*b*, $\Delta_2=5\%$, $t_2=0.14$ μm, $N_2=4$
    (the film thickness of the second core layers 2403*b* with half the film thickness is 0.07 μm, and $N_2=4$ includes the two layers with half the film thickness)
    third core layer 2403*b*, $\Delta_3=0\%$, $t_3=2.61$ μm, $N_3=2$ The wavelength shift amount of the TM mode with respect to the TE mode at the individual output ports of the arrayed waveguide grating fabricated was within ±0.01 nm (the variations between the output ports were 0.003 nm). It was confirmed that the structure composed of the three types of layers with different relative refractive index differences stacked alternately could implement the optical waveguide circuit, the polarization dependence of which was eliminated.

The advantage of constructing the multilayer structure by alternately stacking the three types of layers with different relative refractive index differences is that it can increase the flexibility of selecting the film thicknesses and relative refractive index differences than in the multilayer structure formed by stacking two types of layers with different relative refractive index differences. The average relative refractive index difference of the core and the geometrical birefringence $|B_s|$ due to the multilayer structure are mainly determined by the relative refractive index differences and thicknesses of the layers constituting the multilayer structure. Parameters that define the multilayer structure composed of two types of alternate layers are two relative refractive index differences and two film thicknesses. When one of the four parameters is determined, the other three parameters are determined automatically because the average relative refractive index difference and the geometrical birefringence $|B_s|$ have been determined. On the other hand, there are six types of parameters that define the multilayer structure that is composed of three types of alternate layers. Thus, fixing three of them determines the other three parameters because the average relative refractive index difference and $|B_s|$ have been determined. Therefore, as for the two types of alternate layers, for example, since the relative refractive index difference of the second core layers is set 0% as in the ninth to 15th embodiments, the relative refractive index difference of the first core layers, the thickness of the first core layers and that of the second core layers are determined automatically. In contrast, as for the three types of alternate layers, fixing the relative refractive index differences of the individual layers will automatically determine the thicknesses of the individual layers. Accordingly, the relative refractive index differences are selectable appropriately. When there is a parameter, the fabrication accuracy of which is difficult to achieve as in the case where only three relative refractive index differences specified are allowed, appropriate geometrical birefringence can be implemented only if the film thicknesses are formed at high accuracy, thereby offering an advantage of being able to reduce the birefringence. Another advantage of the multilayer structure composed of three types of alternate layers is that it can bring about photorefractive effect efficiently in the silica-based optical waveguide. The silica-based glass heavily doped with $GeO_2$ can achieve high photorefractive index. Thus, in the multilayer structure composed of three types of alternate layers, it is enough to form layers heavily doped with $GeO_2$, that is, layers with high relative refractive index difference, and to adjust the geometrical birefringence value by the film thicknesses.

It is possible for the present invention to adjust the average relative refractive index difference, dimension, and the birefringence value due to the multilayer structure of the core by the relative refractive index differences, thicknesses and the numbers of layers of the individual layers of the core. Thus, the present invention is not limited to the average relative refractive index difference, dimension, and the birefringence value due to the multilayer structure of the core, or to the refractive indices, thicknesses, and the numbers of layers of the individual layers of the core of the foregoing embodiments.

The single-mode waveguide used for the waveguide array or the like in accordance with the present invention includes a pseudo-single-mode waveguide that consists of a waveguide with two modes or so, and functions almost like a single-mode waveguide in a circuit.

Although the foregoing embodiments employ the arrayed waveguide grating as an optical waveguide circuit using the slab waveguides, this is not essential. They are also applicable to a star coupler or the like.

In addition, although the foregoing embodiments set the geometrical birefringence value due to the multilayer structure at a value nearly equal to the waveguide birefringence value occurring in the conventional core structure, the birefringence of the optical waveguide can be reduced from that of the conventional device as long as the geometrical birefringence value is less than twice the waveguide birefringence value occurring in the conventional core structure, thereby reducing the polarization dependence of the optical circuit.

Furthermore, although the cores are formed by the flame hydrolysis deposition in the foregoing embodiments, other fabrication methods that can form the multilayer structure composed of silica glass are also applicable. For example, they can be formed by the sputtering method, plasma CVD or ECR-CVD (Electron Cyclotron Resonance-Chemical Vapor Deposition), resulting in the reduction or elimination of the waveguide birefringence. In addition, although $GeO_2$ is used to adjust the refractive indices, other dopants such as $TiO_2$ are applicable as long as they can set the refractive indices at desired values. Besides, although they employ silica-based glass as a material of the waveguides, other materials such as glass family materials and polymer materials are also applicable as long as they can form multilayer structure composed of layers with different refractive indices.

In addition, the number of layers of the present embodiment described above can reduce the connection loss between the single-mode waveguide and the optical fiber by an amount of 0.1–0.3 dB, and the smaller number of layers can achieve a smaller value. The excess losses of the optical circuits fabricated are of the order of the conventional values. Accordingly, selecting the number of layers appropriately makes it possible to bring the spot size of light traveling the input/output waveguides to that of the optical fiber without impairing the circuit characteristics, thereby reducing the connection loss with the optical fiber.

In addition, although the foregoing embodiments are applied to the multilayer structure composed of a few types of layers with different refractive indices stacked alternately, this is not essential. For example, they are also applicable to the graded-index structure, the refractive index of which increases from the cladding side layers to the center of the core. When stacking the core layers with different refractive indices alternately, the light perceives the average value of the birefringence distribution due to the stress, and its magnitude is about the same as the waveguide birefringence of the conventional optical waveguides structure. In contrast, as for the graded-index structure, since the electric field distribution is enhanced around the center of the core, the correction coefficient $c_1$ of the foregoing embodiments cannot be used without change, when remarkable stress distribution is present in the core. Accordingly, it is necessary to fabricate several types of appropriate structures to estimate the correction coefficients $c_1$ and $c_2$ suitable for them.

Next, an embodiment will be described applicable to a single-mode waveguide, multi-mode waveguide and slab waveguide with a configuration other than the foregoing configuration. Here, an embodiment applied to the single-mode waveguide will be described. The embodiment 17, however, is not limited to the configuration described here, but the various explanations described above are applicable, as well.

[Embodiment 17]

Figure 25:
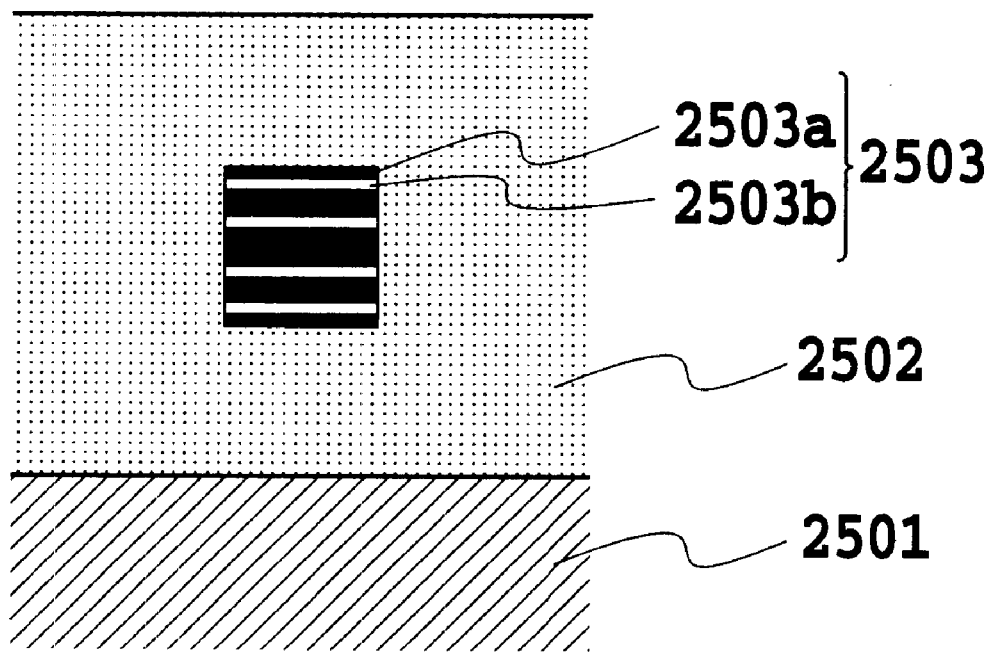
FIG. 25 is a cross-sectional view showing a 17th embodiment in accordance with the present invention.

In addition to the foregoing embodiments, the 17th embodiment in accordance with the present invention has a multilayer structure that implements the graded-index effectively by increasing the thicknesses of high refractive index layers from the layers at both ends of the cladding to the central layer of the core. FIG. 25 shows a cross section of a single-mode waveguide of the present embodiment. A substrate 2501 consists of a silicon substrate, and cladding 2502 and a core 2503 are composed of silica-based glass. The core 2503 has a multilayer structure that is composed of first core layers 2503*a* and second core layers 2503*b* stacked alternately, and has nine layers in total. The thicknesses of the first core layers 2503*a* are gradually increased from both ends of the cladding to the central layer of the core.

The arrayed waveguide grating as shown in FIG. 1B was fabricated in a structure with the following setting so that the average relative refractive index difference $\Delta_{ave}$ became 0.75%. The slab waveguides 112 of the arrayed waveguide grating were formed in the same layer structure as that of the single-mode waveguide.

As for the multilayer structure core 2503 with the average relative refractive index difference $\Delta_{ave}$ of 0.75%, the core dimension was set 6 μm×6 μm, and the individual layers were set as follows:

first core layers 1803a, $\Delta_1=1.75\%$, $t_1=0.28$ μm, 0.55 μm, 0.82 μm, 0.55 μm and 0.28 μm (from top layer to bottom layer)

second core layers 1803b, $\Delta_2=0.0\%$, $t_2=0.88$ μm.

The fabricating process was the same as that of the first embodiment. The cladding was composed of silica-based glass with the magnitude $|B_0|$ of the waveguide birefringence in the conventional core structure being $2.3\times10^{-4}$ as in the first embodiment.

It was confirmed from the transmission spectra of the arrayed waveguide grating fabricated that the wavelength shift was 0.02 nm at the average relative refractive index difference $\Delta_{ave}$ of 0.75%, that the birefringence $|B_e|$ could be reduced to $2\times10^{-5}$, and that the waveguide birefringence could be reduced even in the layer structure with the effective graded-index, thereby being able to reduce the polarization dependence of the optical waveguide circuit.

The magnitude $|B_s|$ of the geometrical birefringence due to the multilayer structure estimated by the mode solver was $1.9\times10^{-4}$, which was smaller than the value $|B_0|=2.3\times10^{-4}$ obtained in the conventional structure. This is probably because the effective graded-index structure, which enhances the electric field distribution in the first core layers around the center, and brings about stress distribution in the core, reduces the birefringence near the core center as in the embodiment 7.

The birefringence is $2\times10^{-5}$ which occurs in addition to the magnitude $|B_s|$ of the geometrical birefringence that is estimated by the mode solver from the magnitude $|B_0|$ of the waveguide birefringence in the conventional core structure, the magnitude $|B_s|$ of the geometrical birefringence obtained by the mode solver, and the birefringence $|B_e|$ estimated from the transmission spectra of the arrayed waveguide grating fabricated. To adjust it in the neighborhood of the foregoing setting for further improvement, the correction coefficients $c_1$ and $c_2$ of equations (1)–(3) can be set at $c_1=0.86$ and $c_2=2\times10^{-5}$.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An optical waveguide circuit including optical waveguides each of which has a cladding and a core formed on a substrate, wherein
said optical waveguide circuit comprises at least one of a single-mode waveguide, a multi-mode waveguide and a slab waveguide, wherein
at least one of said single-mode waveguide, said multi-mode waveguide and said slab waveguide includes at least in its part a multilayer structure that is composed of multiple types of layers with different refractive indices, and has at least three layers in total, wherein
said multilayer structure has first birefringence and second birefringence, the first birefringence deriving from a fact that an effective refractive index of the entire core, which results from contributions of the layers to the refractive index, has different values in directions parallel to and perpendicular to the layers, and the second birefringence deriving from a structure of said waveguide, and wherein
when defining a value of the birefringence of said waveguide as a value obtained by subtracting an effective refractive index in the direction parallel to the substrate from an effective refractive index in the direction perpendicular to the substrate, the value of the first birefringence and the value of the second birefringence have opposite signs.

2. The optical waveguide circuit as claimed in claim 1, wherein the second birefringence has a positive value, and said multilayer structure is composed of layers parallel to said substrate.

3. The optical waveguide circuit as claimed in claim 2, wherein said substrate consists of one of a silicon substrate, and said waveguide is composed of silica-based glass.

4. The optical waveguide circuit as claimed in claim 1, wherein the second birefringence has a negative value, and said multilayer structure is composed of layers parallel to a light traveling direction and perpendicular to said substrate.

5. The optical waveguide circuit as claimed in claim 4, wherein said substrate consists of a silica substrate, and said waveguide is composed of silica-based glass.

6. The optical waveguide circuit as claimed in claim 1, further comprising a birefringence compensator.

7. The optical waveguide circuit as claimed in claim 6, wherein said birefringence compensator utilizes a half waveplate.

8. The optical waveguide circuit as claimed in claim 1, wherein said multilayer structure is composed of two types of layers that have different refractive indices, and are stacked nearly alternately.

9. The optical waveguide circuit as claimed in claim 1, wherein as for the layers constituting said multilayer structure, thicknesses of at least layers with highest refractive index are increased from two end layers adjacent to the cladding to a central layer; thicknesses of at least layers with lowest refractive index are decreased from the two end layers adjacent to the cladding to the central layer; or the thicknesses of at least the layers with the highest refractive index are increased from two end layers adjacent to the cladding to a central layer, and the thickness of at least the layers with the lowest refractive index are decreased from the two end layers adjacent to the cladding to the central layer.

10. The optical waveguide circuit as claimed in claim 1, wherein refractive indices of layers constituting said multilayer structure increase from two end layers adjacent to the cladding toward inmost part of the core.

11. The optical waveguide circuit as claimed in claim 1, wherein a total number of the layers of said multilayer structure is five to ten.

12. The optical waveguide circuit as claimed in claim 1, wherein an average refractive index $n_{ave}$ of the core due to said multilayer structure is given by the following equations (2) and (3), and an absolute value of geometrical birefringence $B_s$ caused by said multilayer structure are given by the following equations (1) and (3):

$$|B_s| = c_1 \left| \sqrt{\sum_i^N n_i^2 q_i} - \frac{1}{\sqrt{\sum_i^N \frac{q_i}{n_i^2}}} \right| + c_2 \qquad (1)$$

$$n_{ave} = \sum_{i}^{N} n_i q_i \qquad (2)$$

$$q_i = \frac{t_i}{\sum_{i}^{N} t_i} \qquad (3)$$

where N is the number of layers of said multilayer structure, $n_i$ and $t_i$ are refractive indices and thicknesses the individual layers, and $c_1$ and $c_2$ are fixed values determined for each waveguide structure by actual measurement or calculation.

13. The optical waveguide circuit as claimed in claim 1, wherein an absolute value of geometrical birefringence caused by said multilayer structure is less than twice an absolute value of a remaining birefringence value.

14. The optical waveguide circuit as claimed in claim 1, wherein values $B_{SM}$, $B_{MM}$ and $B_{SL}$ differ from each other, where $B_{SM}$, $B_{MM}$ and $B_{SL}$ are geometrical birefringence values caused by said multilayer structure of said single-mode waveguide, that of said multi-mode waveguide and that of said slab waveguide.

15. The optical waveguide circuit as claimed in claim 1, further comprising an optical interferometer including two optical couplers and a plurality of waveguides with different lengths interconnecting said two optical couplers, wherein
as for a waveguide with a minimum waveguide length among said plurality of waveguides, when a length of the multilayer structure of its core is L, and
as for the remaining waveguides of said plurality of waveguides, lengths of their multilayer structures equal to L plus differences between lengths of the remaining waveguides and the minimum waveguide length.

16. The optical waveguide circuit as claimed in claim 1, further comprising a Mach-Zehnder interferometer including two optical couplers and two single-mode waveguides interconnecting said two optical couplers.

17. The optical waveguide circuit as claimed in claim 1, further comprising an arrayed waveguide grating including:

two slab waveguides;

a waveguide array consisting of a plurality of single-mode waveguides with different lengths interconnecting said slab waveguides;

an input waveguide consisting of single-mode waveguides connected to one of said two slab waveguides; and an output waveguide consisting of single-mode waveguides connected to the other of said two slab waveguides.

18. The optical waveguide circuit as claimed in claim 14, wherein the values $B_{SM}$, $B_{MM}$ and $B_{SL}$ satisfy a relationship of $|B_{SM}|<|B_{MM}|<|B_{SL}|$.

19. The optical waveguide circuit as claimed in claim 1, wherein refractive indices and thicknesses of the layers constituting said multilayer structure are substantially symmetrical with respect to a central layer.

* * * * *